United States Patent
Makita et al.

(10) Patent No.: US 9,815,472 B2
(45) Date of Patent: Nov. 14, 2017

(54) BRAKING FORCE CONTROL APPARATUS FOR SADDLE RIDE VEHICLE

(71) Applicant: HONDA MOTOR CO., LTD., Minato-ku, Tokyo (JP)

(72) Inventors: Hiroyuki Makita, Wako (JP); Masahiko Tsuchiya, Wako (JP); Eiji Kittaka, Wako (JP); Yasushi Fujimoto, Wako (JP); Naoki Sakamoto, Wako (JP); Masayuki Fujita, Wako (JP); Hiroyuki Kaneta, Wako (JP); Yoshiaki Sawano, Wako (JP); Taisuke Nimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 14/818,594

(22) Filed: Aug. 5, 2015

(65) Prior Publication Data
US 2016/0039423 A1   Feb. 11, 2016

(30) Foreign Application Priority Data
Aug. 8, 2014   (JP) .................................. 2014-163197

(51) Int. Cl.
*B60W 10/10* (2012.01)
*B60W 10/18* (2012.01)
(Continued)

(52) U.S. Cl.
CPC .............. *B60W 30/19* (2013.01); *B60T 7/12* (2013.01); *B60T 8/1706* (2013.01); *B60W 10/10* (2013.01);
(Continued)

(58) Field of Classification Search
CPC .... B60W 10/10; B60W 10/11; B60W 10/113; B60W 10/18; B60W 10/184;
(Continued)

(56) References Cited

U.S. PATENT DOCUMENTS 7,810,603 B2 * 10/2010 Kofuji .................. B62K 25/283
 180/226
7,967,723 B2 *  6/2011 Ebner .................... B60W 30/19
 192/219
(Continued)

FOREIGN PATENT DOCUMENTS

JP       2001-047988 A     2/2001

*Primary Examiner* — Richard Lorence
(74) *Attorney, Agent, or Firm* — Carrier Blackman & Associates, P.C.; Joseph P. Carrier; Fulchand P. Shende

(57) ABSTRACT

A braking force control apparatus for a saddle ride vehicle includes a transmission controller which reduces driving force of an engine by a predetermined speed reduction ratio and transmits the driving force to a drive wheel, a clutch device which connects—disconnects the driving force between the engine and the transmission, a brake device which generates braking force on the drive wheel, and a sensor which detects a state of the transmission. The transmission switches between a neutral state and an in-gear state, and when the sensor detects that the transmission is switching from the neutral state to the in-gear state, the controller causes the brake device to generate braking force on the drive wheel, and then releases the braking force upon completion of the switching to the in-gear state.

15 Claims, 13 Drawing Sheets

(51) Int. Cl.
  *B60W 30/18* (2012.01)
  *B60T 8/17* (2006.01)
  *B60W 30/19* (2012.01)
  *B60T 7/12* (2006.01)
  *B60W 10/184* (2012.01)
  *F16H 3/091* (2006.01)
  *B60T 8/26* (2006.01)
  *B60W 10/188* (2012.01)
  *F16H 3/08* (2006.01)

(52) U.S. Cl.
  CPC .......... *B60W 10/18* (2013.01); *B60W 10/184* (2013.01); *B60W 30/1819* (2013.01); *F16H 3/091* (2013.01); *B60T 8/261* (2013.01); *B60W 10/188* (2013.01); *B60W 30/18027* (2013.01); *B60W 2300/36* (2013.01); *B60W 2510/101* (2013.01); *B60W 2540/16* (2013.01); *B60W 2710/1005* (2013.01); *B60W 2710/18* (2013.01); *F16H 2003/0822* (2013.01)

(58) Field of Classification Search
  CPC ......... B60W 10/188; B60W 30/18027; B60W 30/18109; B60W 30/19; B60W 2300/36; B60W 2510/101; B60W 2540/16; B60W 2710/1005; B60W 2710/18; B60T 7/12; B60T 8/1706
  USPC ...................................................... 192/219
  See application file for complete search history.

(56) References Cited

U.S. PATENT DOCUMENTS 8,042,420 B2* 10/2011 Tsunashima .......... F16H 61/688
  701/64
2011/0238261 A1* 9/2011 Tsuyuguchi ........... B62K 11/14
  701/29.2

* cited by examiner

BRAKING FORCE CONTROL APPARATUS FOR SADDLE RIDE VEHICLE

CROSS-REFERENCE TO RELATED APPLICATIONS

The present invention claims priority under 35 USC 119 based on Japanese patent application No. 2014-163197, filed on Aug. 8, 2014. The entire subject matter of this priority document, including specification claims and drawings thereof, is incorporated by reference herein.

BACKGROUND OF THE INVENTION

1. Field of the Invention

The present invention relates to a braking force control apparatus for a saddle ride vehicle, and more particularly relates to a braking force control apparatus for a saddle ride vehicle which automatically creates braking force at appropriate timing during various driving modes of the vehicle, including a normal driving mode, a slow speed driving mode, and when the vehicle is being switched between these modes.

2. Background Art

There has heretofore been known a braking force control apparatus which automatically generate braking force to stop wheels of a vehicle regardless of an operation by a driver under predetermined conditions.

Japanese Patent Application Publication No. 2001-47988 (JP A 2001-47988) discloses a braking force control apparatus for a four-wheel vehicle, which maintains braking force until a start operation is performed even after an operator stops depressing a brake pedal, in order to realize smooth restart on an uphill road.

This braking force control apparatus is configured to improve stability during restart by performing control such that a time before the braking force reaches zero is constant, regardless of the magnitude of the maintained braking force, when releasing the maintained braking force along with a restart operation.

Problems to be Solved by the Invention

Incidentally, as a transmission for a saddle ride vehicle such as a motorcycle, there has been known a constantly engaged step transmission including a plurality of gear trains arranged between an input-side main shaft and an output-side sub shaft. Such a transmission transmits power of an engine to a drive wheel by connecting a clutch mechanism provided between the engine and the transmission after switching from a neutral state where the gear trains are mechanically disconnected to an in-gear state where the disconnected gear trains are mechanically connected.

Here, when the transmission is switched from the neutral state to the in-gear state during stopping in a state where the engine is on, the sub shaft is completely stopped while the main shaft is rotated (dragged around by a crankshaft) by dragging of a clutch. Thus, force of rotating the drive wheel is generated at the moment of switching to the in-gear state, and such force may cause behavior in the vehicle body.

In order to suppress such behavior, it is conceivable to cause the braking force to act on the drive wheel side during switching to the in-gear state. However, the technique described in JPA 2001-47988 is targeted for hill start during normal driving, and no consideration has been made on the action of the braking force according to the state of the transmission.

SUMMARY OF THE INVENTION

It is an object of the present invention to solve the problems of the conventional technique described above, and to provide a braking force control apparatus for a saddle ride vehicle, which generates braking force when switching a transmission from a neutral state to an in-gear state. In the following description of aspects of the present invention reference numbers and characters are used which correspond to exemplary embodiments of the present invention as disclosed herein. Such exemplary embodiments and use of the reference numbers and characters are only provided for illustration and better understanding of the present invention, but are not intended to limit the claimed invention as defined in the claims appended herein.

For the purpose of solving the above-mentioned problems, according to a first aspect of the present invention there is provided a braking force control apparatus in a saddle ride vehicle, including: a control device (106) configured to control a transmission (40) which reduces driving force of an engine (100) by a predetermined speed reduction ratio and transmits the driving force to a drive wheel (WR) of a vehicle (1), a clutch device (108) which connects and disconnects the driving force between the engine (100) and the transmission (40), a brake device (BR) which generates braking force on the drive wheel (WR), and a sensor which detects a state of the transmission (40), wherein the transmission (40) is configured to switch between a neutral state where gear trains thereof are mechanically disconnected and an in-gear state where the gear trains are mechanically connected, and when the sensor detects that the transmission is switching from the neutral state to the in-gear state, the control device (106) causes the brake device (BR) to generate braking force (B) on the drive wheel (WR), and then releases the braking force (B) upon completion of the switching to the in-gear state.

According to a second aspect of the present invention, the transmission includes a shaft, dog clutches which slide on the shaft, and gears which are engaged by the dog clutches to which the gears are adjacent, and wherein the switching between the neutral state and the in-gear state by the transmission (40) is performed by connecting and disconnecting the dog clutches.

According to a third aspect of the present invention, the drive wheel (WR) is pivotally supported by a swing arm (27) that is swingably supported on a vehicle body of the vehicle (1) through a rear cushion According to a fourth aspect of the present invention the gear trains of the transmission (40) include a backward gear train (180) which enables backward driving of the vehicle (1) by the driving force of the engine (100), and the in-gear state includes an operation state using the backward gear train (180) as a driving force transmission path.

Effects of the Invention

According to the first aspect of the present invention, the transmission is configured to switch between a neutral state where gear trains thereof are mechanically disconnected and an in-gear state where the gear trains are mechanically connected, and when the sensor detects that the transmission has switched from the neutral state to the in-gear state, the control device causes the brake device to generate braking force on the drive wheel, and then releases the braking force when the sensor detects completion of the switching to the in-gear state. Thus, in switching the gear trains in the transmission from the neutral state to the in-gear state, behavior of the vehicle associated with the rotation of the drive wheel can be reliably prevented by the brake mechanism inhibiting the rotation of the drive wheel. Accordingly, the behavior of the vehicle can be suppressed without providing a synchronizer or the like for absorbing a difference in rotation between the speed change gears. As a result, an increase in size of the transmission can be prevented, and thus the saddle ride vehicle can be reduced in size and weight.

Moreover, convenience for the rider can be improved by automatically releasing the braking force when the braking force is no longer required upon completion of the switching to the in-gear state.

According to the second aspect of the present invention, the switching between the neutral state and the in-gear state by the transmission is performed by connection and disconnection of dog clutches which slide on a shaft of the transmission and are engaged with adjacent gears. Conventionally, when a transmission is in the neutral state during stopping with the engine on, a sub shaft of the transmission is completely stopped while a main shaft of the transmission is rotated by dragging of a wet clutch due to viscosity of a lubricant oil. Thus, behavior is likely to be caused in the vehicle body when the transmission is switched to the in-gear state by engaging dog clutches. However, the braking force control apparatus according to the second aspect of the present invention is particularly effective in suppressing such behavior.

According to the third aspect of the present invention, the drive wheel is pivotally supported by a swing arm that is swingably supported on a vehicle body of the vehicle through a rear cushion. Conventionally, when no brake control is executed, particularly in a state where a brake on a wheel (front wheel) that is not the drive wheel is activated, the rear cushion is extended by the driving force in the in-gear state, making a seating position of the rider likely to be moved. However, the braking force control apparatus according to the third aspect of the present invention can suppress such vehicle behavior.

According to the fourth aspect of the present invention, the gear trains of the transmission include a backward gear train which enables backward driving of the vehicle by the driving force of the engine, and the in-gear state includes an operation state using the backward gear train as a driving force transmission path. Conventionally, when the backward gear train is used as the driving force transmission path, behavior of moving the vehicle backward occurs in the in-gear state. However, the braking force control apparatus according to the fourth aspect of the present invention can also prevent such behavior.

For a more complete understanding of the present invention, the reader is referred to the following, non-limiting, detailed description section, which describes exemplary embodiments of the present invention and should be read in conjunction with the accompanying drawings. Again, such exemplary embodiments are provided for illustration and better understanding of the present invention and are not intended to limit the invention. Throughout the following detailed description and in the drawings, like numbers refer to like parts.

DETAILED DESCRIPTION OF MODES FOR CARRYING OUT THE INVENTION

Figure 1:
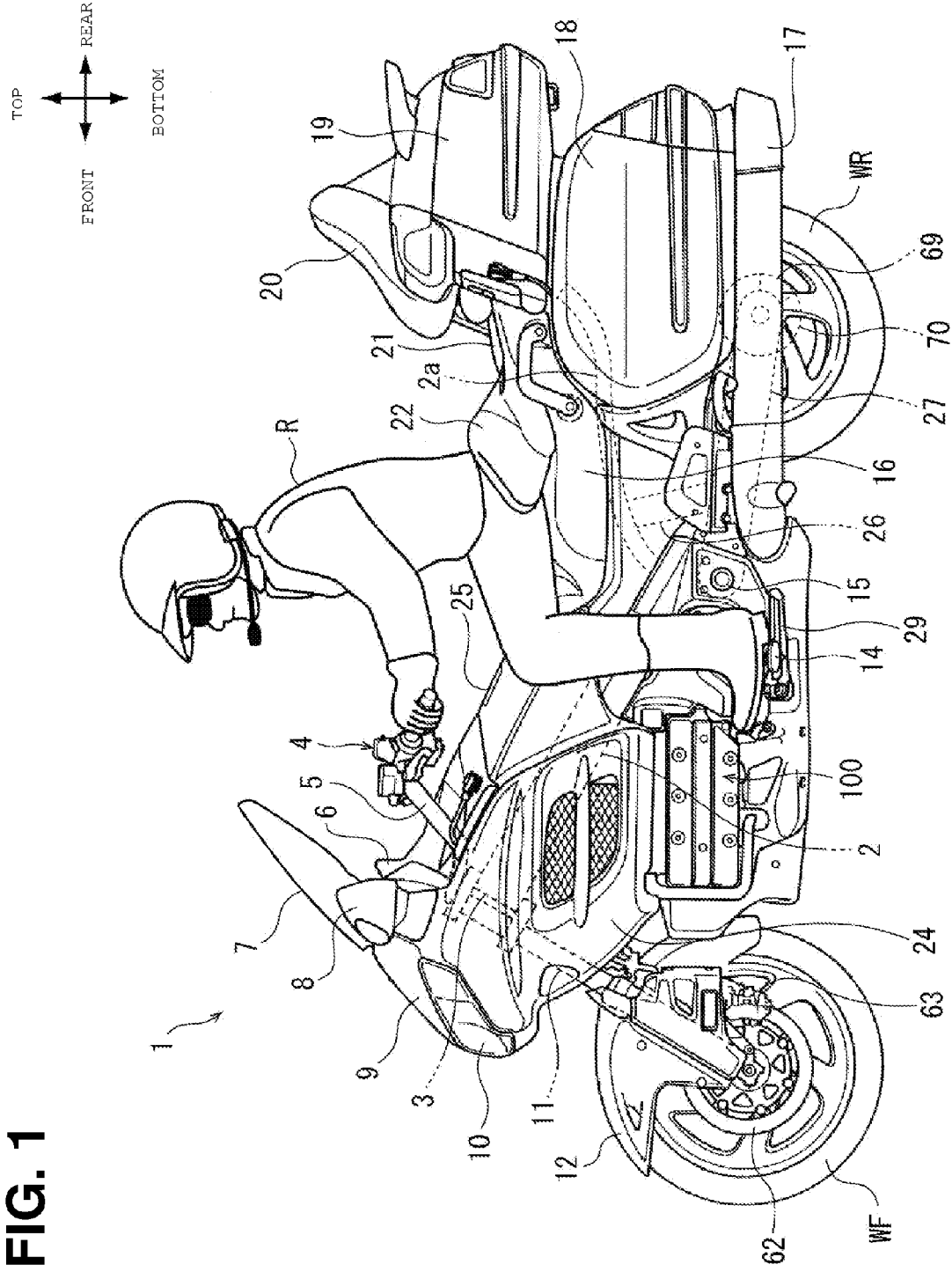
FIG. 1 is a left-side view of a motorcycle to which a braking force control apparatus according to one exemplary embodiment of the present invention is applied.

With reference to the drawings, exemplary embodiments of the present invention are described in detail below. FIG. 1 is a left-side view of a motorcycle 1 to which a braking force control apparatus according to one exemplary embodiment of the present invention is applied. The motorcycle 1 is a large saddle ride vehicle with a large horizontally opposed six-cylinder engine as its power source, including a large cowling and multiple storage boxes.

At the front part of a vehicle body frame 2, a head pipe 3 rotatably supporting a steering stem (not shown) is provided. A pair of left and right front forks 11 rotatably supporting a front wheel WF are fixed to and steerably supported by the steering stem. A steering handle 5 is attached to the upper end of the front forks 11, and a front fender 12 covering over the front wheel WF is attached approximately in the middle of the front forks 11.

An engine 100 is suspended and fixed below a pair of left and right main tubes extending backward and downward from the head pipe 3. A pivot shaft 15 swingably supporting a swing arm 27 is provided at the rear end of the main tubes behind the engine 100. A rear frame 2a is provided at the rear end of the vehicle body frame 2, the rear frame 2a extending backward and upward from above the pivot shaft 15 and supporting a seat 16, a pair of left and right pannier cases 18, and the like. A pair of left and right foot-rest steps 14 for a rider R are attached in front of and below the pivot shaft 15.

The swing arm 27 rotatably supporting a rear wheel WR as a drive wheel is suspended from the vehicle body by a rear cushion 26 connected to the rear frame 2a. Driving force of the engine 100 is transmitted to the rear wheel WR through a drive shaft (not shown) penetrating the swing arm 27, and combustion gas from the engine 100 is discharged from the rear ends of a pair of left and right mufflers 17.

The pair of left and right pannier cases 18 are attached as storage boxes above the mufflers 17. The seat 16 is provided with a lower back rest 22 for the rider R to be seated in front and a seating part 21 for a pillion passenger. Also, a backrest 20 for the pillion passenger is provided in front of a top box 19 as a storage box installed in the center in the vehicle width direction.

The front side of the head pipe 3 is covered with a front cowl 9 having a headlight 10. A pair of left and right side cowls 24 covering over the vehicle body frame 2 and the engine 100 are connected to the rear part of the front cowl 9. In front of the steering handle 5, a pair of left and right rearview mirrors 8 integrated with a blinker device are attached at positions on the outside of the front cowl 9 in the vehicle width direction. Between the seat 16 and the steering handle 5, a filler lid 25 of a fuel tank is provided.

At a position in front of the rider R between the left and right rearview mirrors 8, a windscreen 7 is provided, which is adjustable in position in the height direction. An indicator panel 6 is provided at the center in the vehicle width direction immediately behind the windscreen 7. A steering handle switch 3 having a plurality of operation switches is installed to the left of the steering handle 5 in the vehicle width direction.

The front wheel WF as the other wheel as opposed to the rear wheel WR as the drive wheel is provided with a front brake disk 62 and a front brake caliper 63 which generates friction force by sandwiching the front brake disk. The rear wheel WR is provided with a rear brake disk 70 and a rear brake caliper 69. The front wheel brake is operated mostly by a brake lever provided on the steering handle 5 on the right side in the vehicle width direction, while the rear wheel brake is operated mostly by a brake pedal disposed below the right foot-rest step 14 in the vehicle width direction. Below the left foot-rest step 14, a side kickstand 29 is attached.

Figure 2:
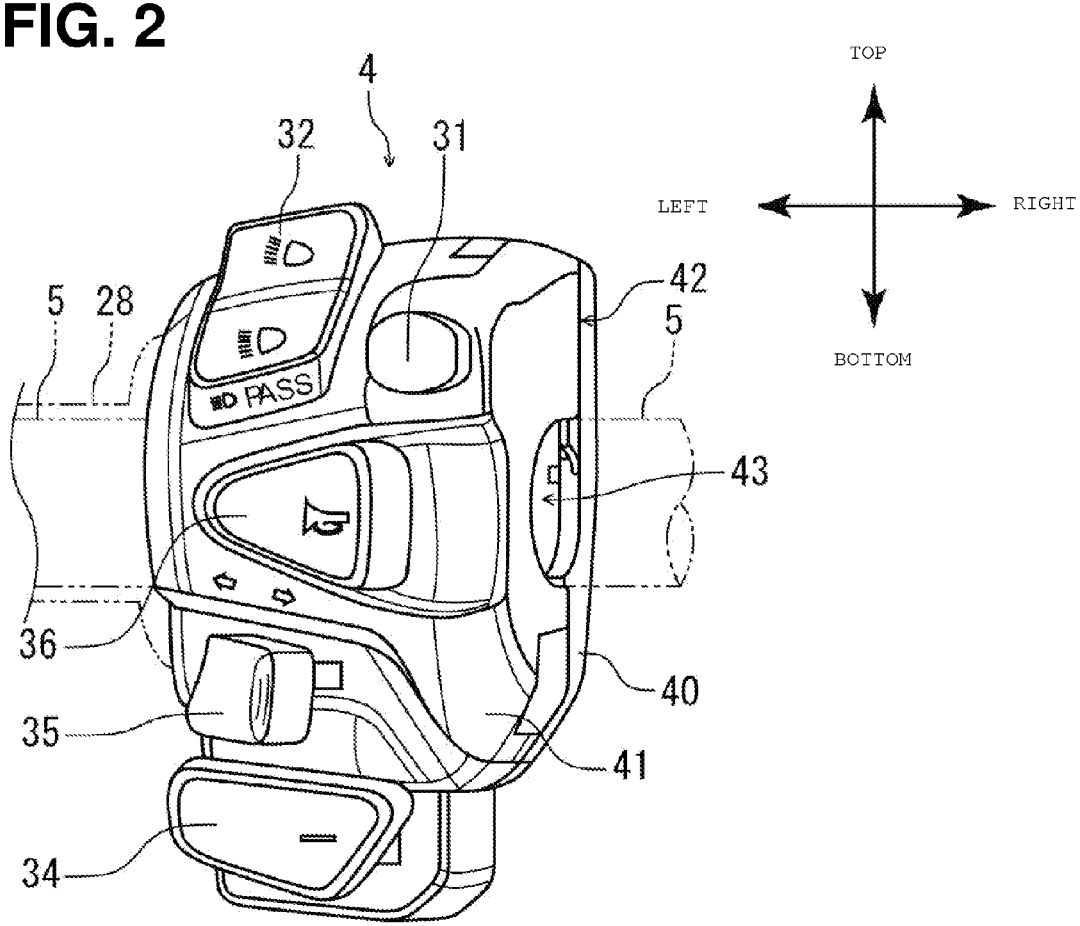
FIG. 2 is a perspective view of a steering handle switch of the motorcycle of FIG. 1 seen from the rider side.
Figure 3:
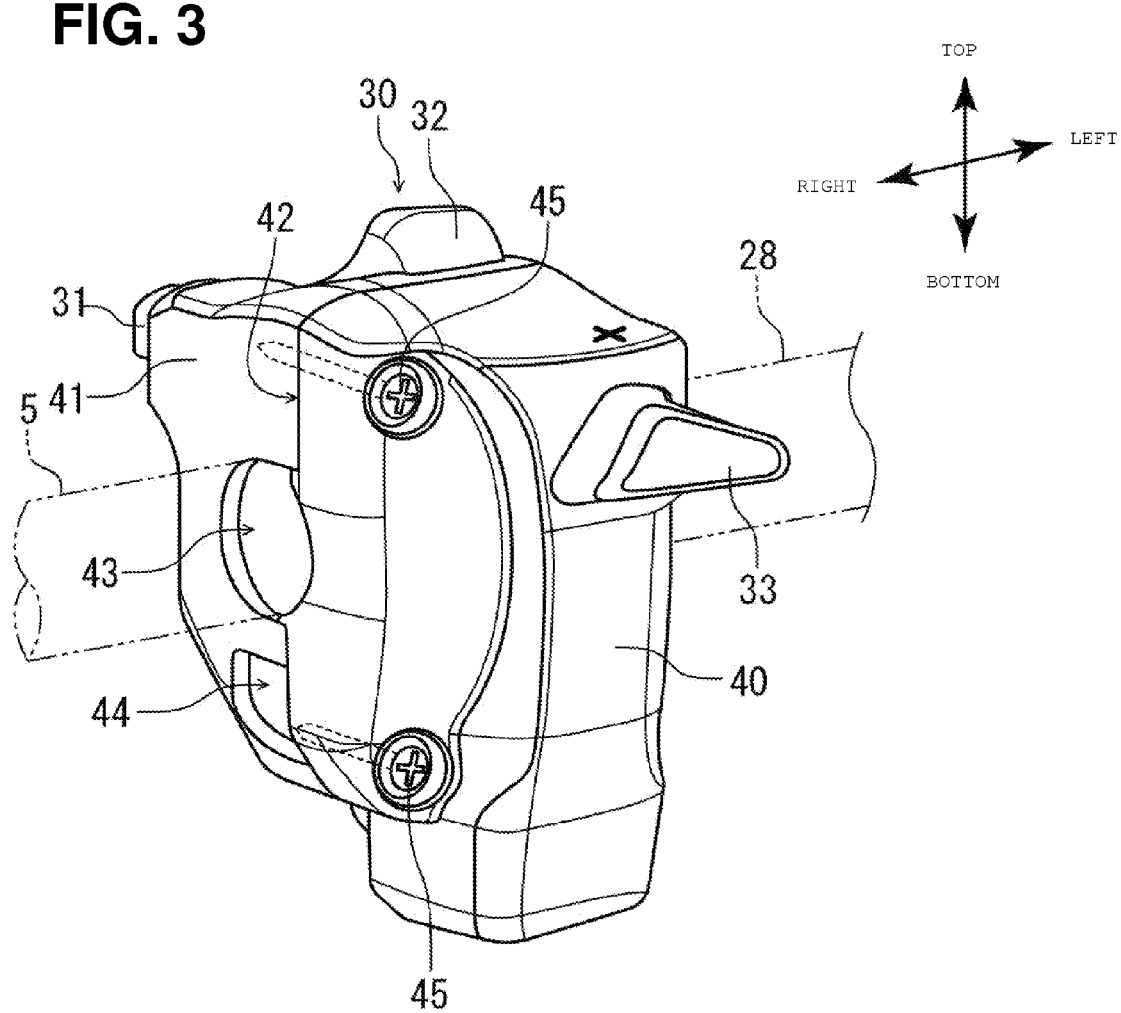
FIG. 3 is a perspective view of the steering handle switch of FIG. 2 seen from the vehicle body front side.

FIGS. 2 and 3 are perspective views of the steering handle switch 4 provided on the steering handle 5 of the motorcycle 1 on the left side in the vehicle width direction. The steering handle switch 4 adjacent to the vehicle body center side of a steering handle grip 28 is provided with: an optical axis changing switch 32 for the headlight (head lamp); a horn switch 36; a blinker switch 35; a slow speed mode selector switch 31; and a shift-up switch 33 and a shift-down switch 34 as shift operation means for performing a gear change operation of the transmission (giving an instruction to change gear).

The steering handle switch 4 is fixed to the steering handle 5 by connecting two split switch cases while sandwiching the steering handle 5 from the front and back. In the switch cases, a clamp hole 43 is formed to clamp the steering handle 5.

The horn switch 36 to be swingably pressed is disposed at approximately the same height as the steering handle 5, and the seesaw-type optical axis changing switch 32 is disposed thereabove. To the right of the optical axis changing switch 32 in the vehicle width direction, the slow speed mode selector switch 31 is disposed, which switches between on and off states by holding up and down a manipulator. Below the horn switch 36, the blinker switch 35 is disposed, which is operated to slide to the left and right to activate turn signals.

The optical axis changing switch 32 is the seesaw type that swings about a pivot shaft. The head lamp is directed upward (high beam) when the optical axis changing switch 32 is swung to the front side of the vehicle body, and is directed downward (low beam) when the optical axis changing switch 32 is swung to the rear side of the vehicle body. Moreover, passing lighting using the high beam can be performed by further pressing the optical axis changing switch 32 toward the passenger from the low beam position. The horn switch 36 includes a pivot shaft on its outer end in the vehicle width direction, and is configured to swing by pressing an operation surface closer to the inner side of the vehicle body toward the front of the vehicle body.

The box-shaped switch cases formed of injection-molded resin or the like have a two-divided (two-split) structure, including: a front-side case half 40 as a "first case" positioned at the front side of the vehicle body; and a rear-side case half 41 as a "second case" positioned at the rear side (passenger side) of the vehicle body. The both case halves 40 and 41 are connected to each other by two fastening screws 45 to be inserted from the front side of the front-side case half 40. By this connection, the both case halves 40 and 41 are connected on a divided face 42, and the steering handle switch 4 is fixed to the steering handle 5. Below the clamp hole 43 on the inner side in the vehicle width direction, a slot 44 is provided for a harness in which wires to be connected to the respective switches are bundled.

The shift-up switch 33 provided on the front-side case half 40 is suitable for an operation of pulling toward the rider with the index finger of his left hand holding the steering handle grip 28. On the other hand, the shift-down switch 34 provided on the rear-side case half 41 is suitable for an operation of pushing with the left thumb. The both switches 33 and 34 are easily operated both at the same time in such a manner as the rider R squeezing his or her palm.

The motorcycle 1 according to this exemplary embodiment is configured to permit the rider R to select between a normal driving mode and a "slow speed mode" for an operation (so-called take-around operation) of the rider R moving the vehicle body forward and backward at low speed on the motorcycle 1 or moving the vehicle body forward and backward at low speed while standing on the side of the motorcycle 1 and supporting the vehicle. Note that the vehicle speed V assumed in the take-around state is $0 \leq V < 8$ km/h. According to such setting, operability can be improved for the take-around operation by keeping the vehicle speed within a speed range in which the rider can support the vehicle body with his/her body.

In this exemplary embodiment, the slow speed mode selector switch 31 is pressed under predetermined conditions to shift from the normal driving mode to the slow speed mode. Then, when the shift-down switch 34 is pressed while the slow speed mode is being selected, slow speed forward driving is performed using the engine driving force. On the other hand, when the shift-up switch 33 is pressed, slow speed backward driving is performed using the engine driving force. Also, when the slow speed mode selector switch 31 is pressed during the slow speed mode, the mode is returned to the normal driving mode. Note that the slow speed forward driving and the slow speed backward driving are both executed at a predetermined value of less than 8 km/h.

When the slow speed mode is selected, adjustment of the driving force by a rotation operation of a throttle grip is treated as invalid. Then, throttle control is performed so as to generate constant engine driving force suitable for slow speed driving or to generate engine driving force that enables driving at a constant slow speed regardless of the slope of the road surface. By limiting the driving operation in the slow speed mode to the shift operation means, not only erroneous operations can be prevented but also slow speed driving can be realized while avoiding a linear reaction such as may result form normal operation of the throttle grip.

This is realized because, as described later, a throttle device for adjusting the output of the engine 100 is of a throttle-by-wire type that drives a throttle valve by a motor according to at least turning angle information of the throttle grip. Thus, a difference in driving operation between the normal driving mode and the slow speed mode can be easily created. Moreover, highly accurate output control can be performed also during the slow speed driving, thus facilitating control such as easing the reaction of the engine output to the operation by the shift operation means.

Note that, as to the setting of the slow speed driving switch while the slow speed mode is being selected, forward driving may be performed when the shift-up switch 33 is pressed, and backward driving may be performed when the shift-down switch 34 is pressed. Also, the switching operation between the normal driving mode and the slow speed mode may be set to be executed by simultaneously pressing the shift-up switch 33 and the shift-down switch 34, for example, without providing a dedicated selector switch.

Figure 4:
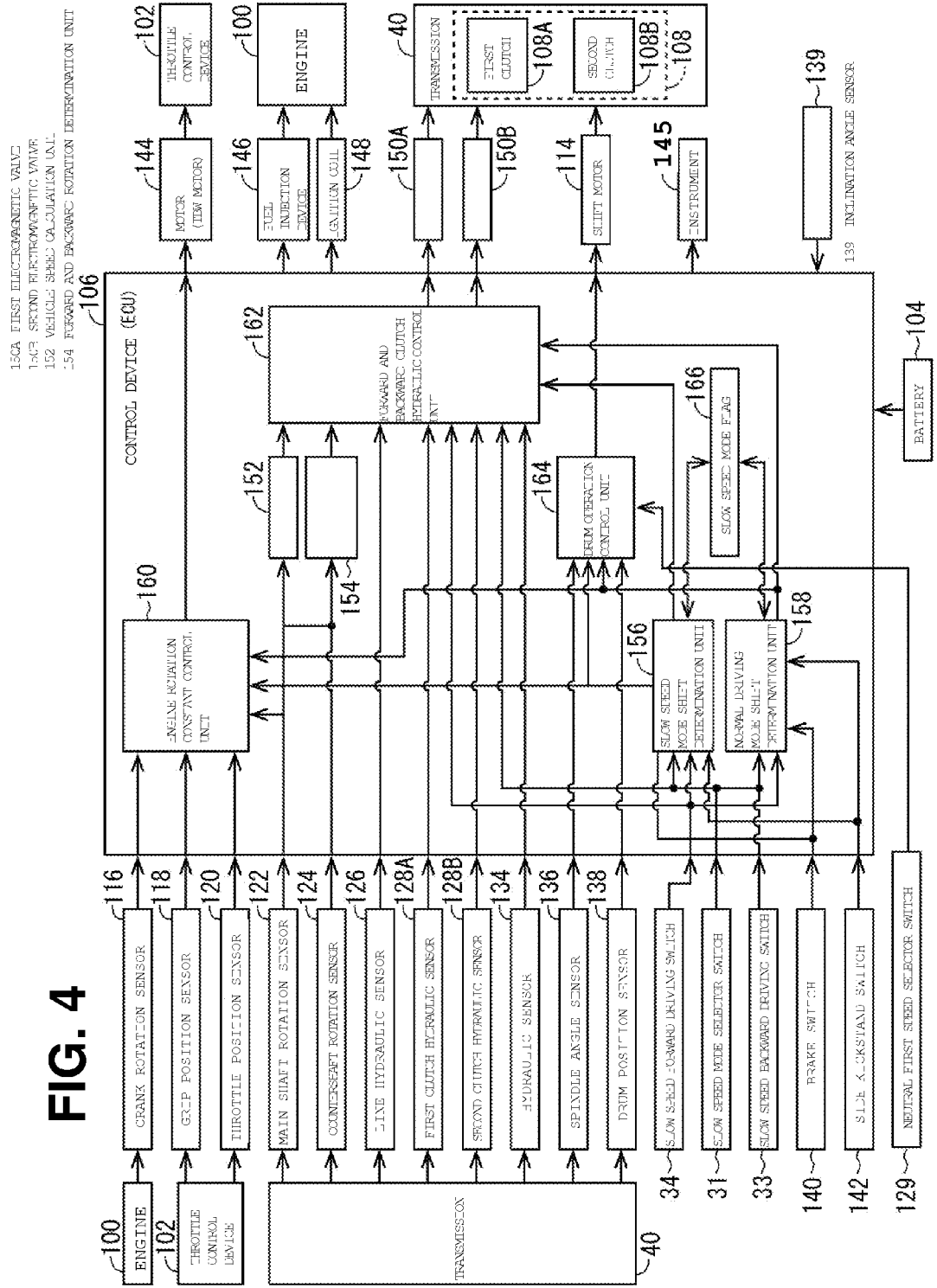
FIG. 4 is a block diagram showing a configuration of a braking force control apparatus for a saddle ride vehicle according to an exemplary embodiment of the present invention.
Figure 5:
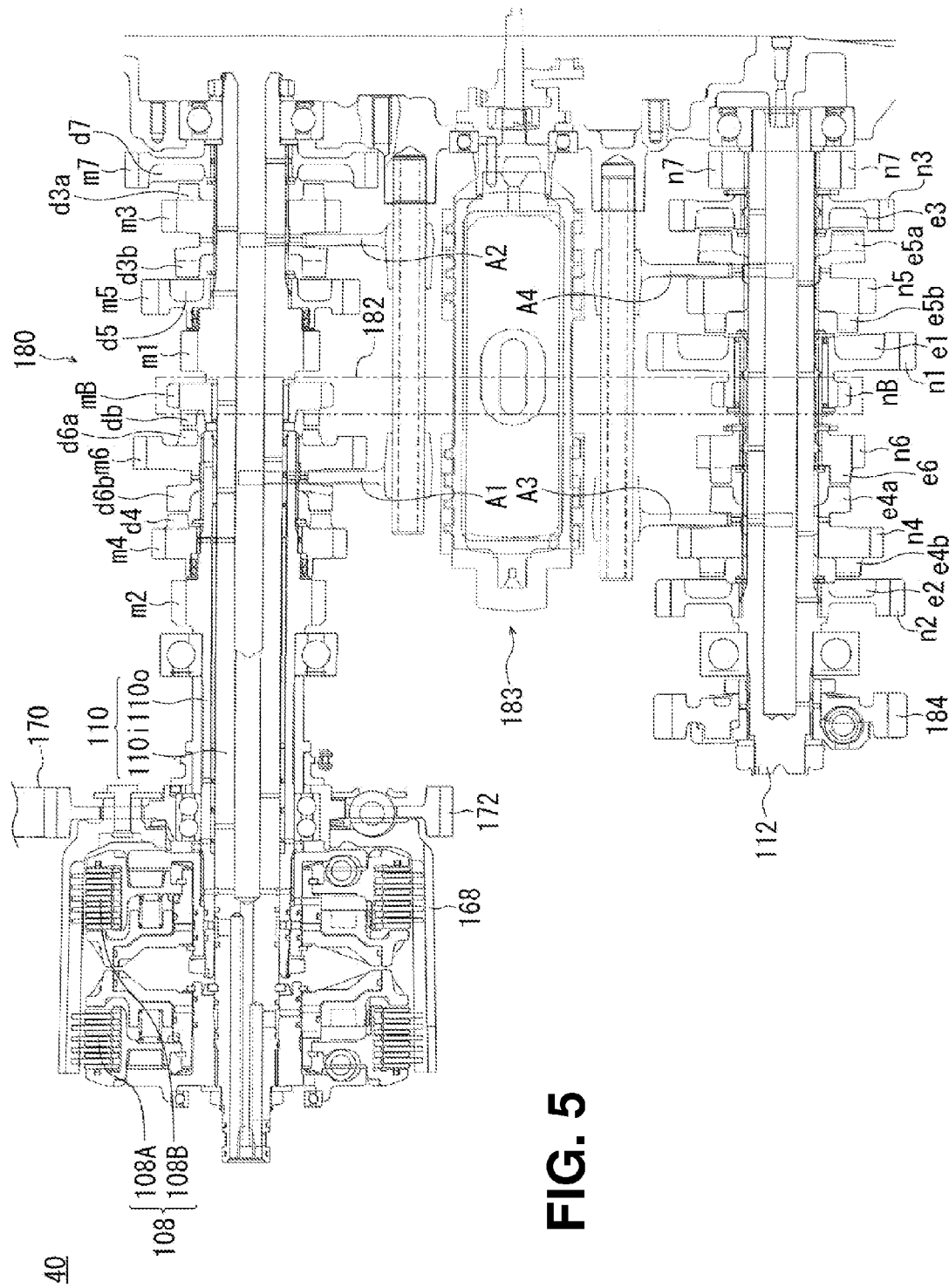
FIG. 5 is a cross-sectional view of a transmission of the motorcycle of FIG. 1.
Figure 6:
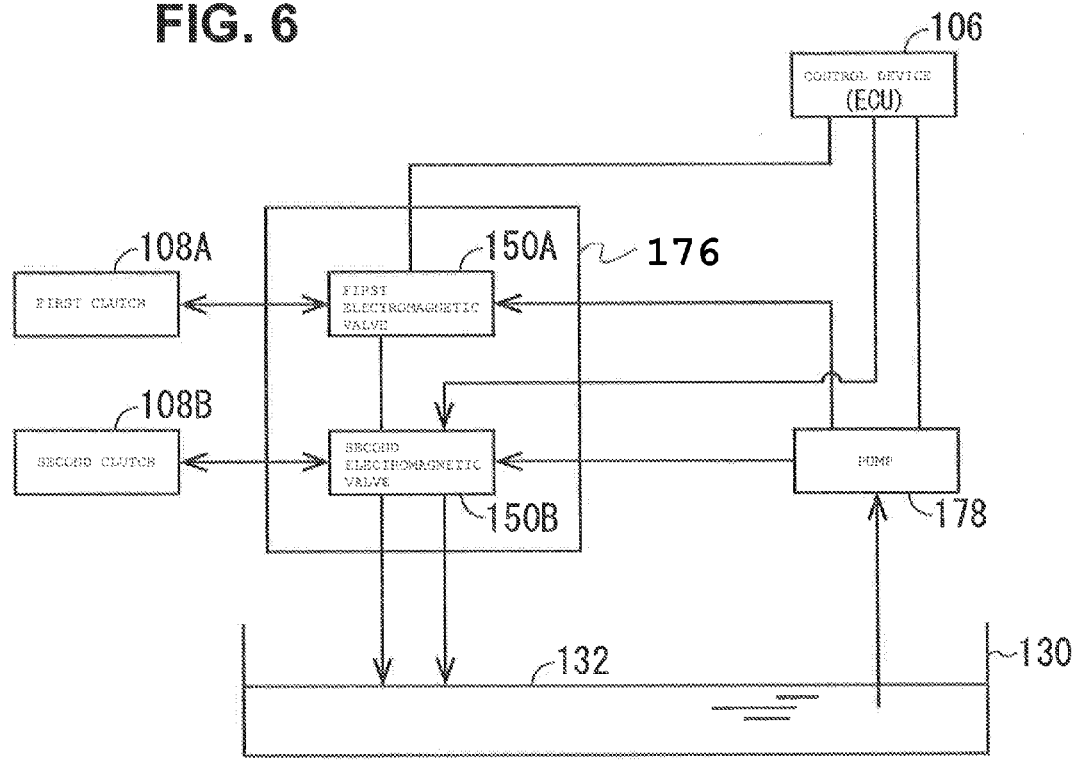
FIG. 6 is a block diagram showing a configuration of a hydraulic control path in a clutch device of the motorcycle of FIG. 1.
Figure 7:
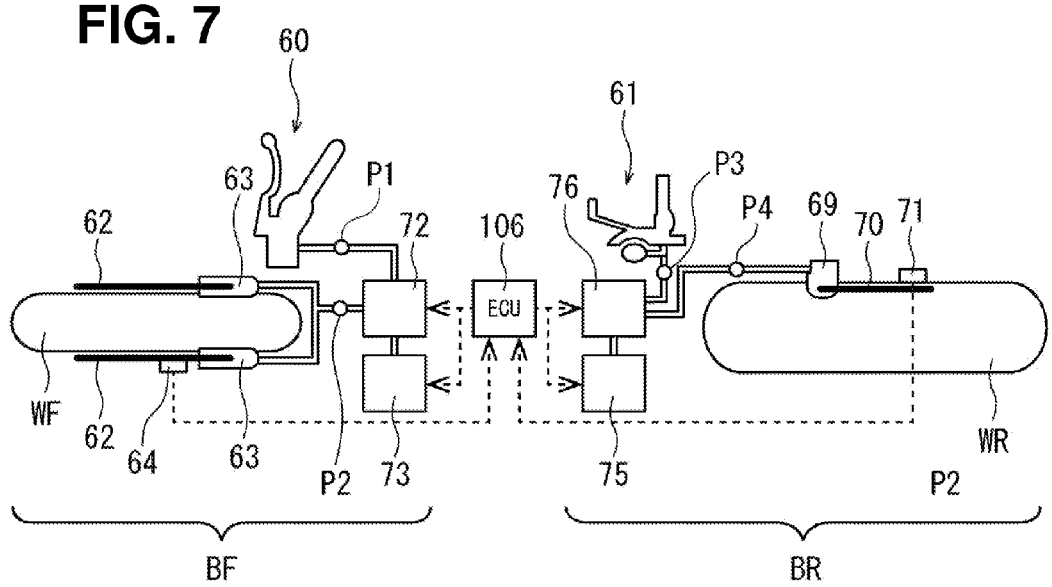
FIG. 7 is a block diagram showing a configuration of a hydraulic control path in a braking device of the motorcycle of FIG. 1.

FIG. 4 is a block diagram showing a configuration of the braking force control apparatus for the saddle ride vehicle according to this exemplary embodiment. FIG. 5 is a cross-sectional view of a transmission 40 of the motorcycle. FIG. 6 is a block diagram showing a configuration of a hydraulic control path in a clutch device of the motorcycle. FIG. 7 is a block diagram showing a configuration of a hydraulic control path in a braking device of the motorcycle.

The motorcycle 1 includes: the engine 100 that rotationally drives a crankshaft; a throttle control device (throttle-by-wire: TBW) 102 that electronically controls a throttle; the transmission 40 that transmits output of the crankshaft to a drive shaft; and a control device (ECU) 106 that executes program(s) stored on computer-readable media and receives power from a battery 104 to control the motorcycle 1.

The transmission 40 includes a hydraulically-driven clutch device 108 of a dual clutch type including a first clutch 108A and a second clutch 108B. The clutch device 108 is a normally open type that increases clutch torque with an increase in hydraulic pressure to be supplied. The transmission 40 includes: a main shaft 110 and a countershaft (sub shaft) 112, which are disposed parallel to the crankshaft (not shown); a shift spindle (not shown) rotationally driven by a shift motor 114; and a shift drum 183 for interlocking the driving force by selectively dogging in speed change gears according to a rotation angle of the shift spindle.

The countershaft 112 normally rotates only in one direction. However, in this exemplary embodiment, the countershaft 112 rotates in a direction opposite to that during the normal driving mode, during backward driving in the slow speed mode.

The main shaft 110 is provided with drive gears m1 to m7 for seven speeds, while the countershaft 112 is provided with driven gears n1 to n7 for seven speeds. The drive gears m1 to m7 and the driven gears n1 to n7 engage with each other at corresponding gear positions, and form speed change gear pairs corresponding to the respective speeds, respectively (see FIG. 5).

A crank rotation sensor 116 for detecting a rotation frequency of the crankshaft is attached to the engine 100. A grip position sensor 118 for detecting the rotation angle of a throttle grip attached to the right of the steering handle 5 and a throttle position sensor 120 for detecting the position of the throttle valve in the engine 100 are connected to the throttle control device 102.

The transmission 40 includes: a main shaft rotation sensor 122 and a countershaft rotation sensor 124 for detecting rotation frequencies of the main shaft 110 and the countershaft 112, respectively; a line hydraulic sensor 126 for detecting a hydraulic pressure in a hydraulic path in the clutch device 108; a first clutch hydraulic sensor 128A for detecting a hydraulic pressure in the first clutch 108A; a second clutch hydraulic sensor 128B for detecting a hydraulic pressure in the second clutch 108B; an oil temperature sensor 134 for detecting the temperature of oil 132 in an oil pan 130 (see FIG. 6); a spindle angle sensor 136 for detecting the rotation angle of the shift spindle; and a drum position sensor 138 for detecting the position of the shift drum 183.

Detection signals from the various sensors are inputted to the control device 106. In addition to such detection signals, various signals from the shift-up switch 33, the shift-down switch 34, a brake switch 140 and a side kickstand switch 142 are inputted to the control device 106.

The shift-up switch 33 and the shift-down switch 34 according to this exemplary embodiment output ON signals over a period in which the both switches are operated, and output OFF signals for a period in which the both switches are not operated. Likewise, the brake switch 140 outputs ON signals over a period in which the brake lever or the brake pedal is operated, and outputs OFF signals for a period in which neither the brake lever nor the brake pedal is operated. Meanwhile, the side kickstand switch 142 outputs an ON signal when the side kickstand 29 is in a down state, and outputs an ON signal in an up state.

Based on the detection signals from the various sensors and the signals from the various switches, the control device 106 controls a motor (TBW motor) 144 for the throttle control device 102, a fuel injection device 146 and an ignition coil 148 for the engine 100, the shift motor 114 for the transmission 40, a first electromagnetic valve 150A for controlling the hydraulic pressure in the first clutch 108A, and a second electromagnetic valve 150B for controlling the hydraulic pressure in the second clutch 108B. The control device 106 outputs the result of calculations within the control device 106 to an instrument panel 145. The instrument panel 145 outputs the inputted calculation results by analog display, digital display and lamp display.

In the control device 106, a determination unit for realizing the slow speed mode is composed mainly of a vehicle speed calculation unit 152, a forward and backward rotation determination unit 154, a slow speed mode shift determination unit 156, a normal driving mode shift determination unit 158, an engine rotation constant control unit 160, a forward and backward clutch hydraulic control unit 162 and a drum operation control unit 164.

The vehicle speed calculation unit 152 calculates a vehicle speed based on the detection signal from the counter shaft rotation sensor 124. The forward and backward rotation determination unit 154 determines whether forward rotation or backward rotation is performed, based on the detection signal from the counter shaft rotation sensor 124. The engine rotation constant control unit 160 detects an engine rotation speed based on the output from the main shaft rotation sensor 122.

The slow speed mode shift determination unit 156 determines whether or not to make a shift to the slow speed mode based on the signals from the various sensors and the various switches. When a shift is made to the slow speed mode, a slow speed flag 166 is set to "1". The normal driving mode shift determination unit 158 determines whether or not to make a shift to the normal driving mode based on the signals from the various sensors and the various switches. When a shift is made to the normal driving mode, the slow speed mode flag 166 is reset to "0".

The engine rotation constant control unit 160 has a function to control the engine rotation speed in a constant state (e.g., an idling state) by inactivating the throttle operation of the right grip by the rider R.

The forward and backward clutch hydraulic control unit 162 performs brake control for stopping, clutch hydraulic control for forward driving and clutch control for backward driving, based on the vehicle speed information from the vehicle speed calculation unit 152, the determination result from the forward and backward rotation determination unit 154 and the detection signals from the various hydraulic sensors (126, 128A and 128B) and the oil temperature sensor 134.

The drum operation control unit 164 drives the shift motor 114 so that the position of the shift drum 183 is set at a preset slow speed mode position, during a shift from the normal driving mode to the slow speed mode. Also, the drum operation control unit 164 drives the shift motor 114 so that the position of the shift drum 183 is set at a neutral position, during a shift from the slow speed mode to the normal driving mode. The signal of the shift motor 114 is feedback-controlled based on the detection signals from the spindle angle sensor 136 and the drum position sensor 138.

With reference to FIG. 5, the clutch device 108 includes an odd-numbered disk clutch (the first clutch 108A) and an even-numbered disk clutch (the second clutch 108B), which are coaxially arranged adjacent to each other. The main shaft 110 has a double-pipe structure in which an inner shaft (inner main shaft) 110$i$ and an outer shaft (outer main shaft) 110$o$ are coaxially provided. The first clutch 108A is provided at one end of the inner shaft 110$i$, while the second clutch 108B is provided at one end of the outer shaft 110O.

A main-side driven gear 172 to be engaged with a crank-side drive gear 170 of the crankshaft is provided coaxially with a clutch outer 168 shared by the first clutch 108A and the second clutch 108B. Through the crank-side drive gear 170 and the main-side driven gear 172, rotational driving force from the crankshaft is inputted to the clutch outer 168. The rotational driving force inputted to the clutch outer is transmitted individually to the inner shaft 110$i$ and the outer shaft 110$o$ according to connection states of the first and second clutches 108A and 108B.

With reference to FIG. 6, the connection states of the first and second clutches 108A and 108B are individually controlled based on the presence or absence of hydraulic pressure supply from a hydraulic pressure supply device. The hydraulic pressure supply device includes: a clutch controller 176; and an oil pump 178 for pumping up the oil 132 in the oil pan 130 and supplying the oil to the clutch device 108. The clutch controller 176 has the first electromagnetic valve 150A and the second electromagnetic valve 150B.

The first electromagnetic valve 150A controls the hydraulic pressure to the first clutch 108A based on an instruction from the control device 106. More specifically, the inner shaft 110$i$ and the crankshaft are connected by applying the hydraulic pressure to the first clutch 108A. On the other hand, the connection is cut off by reducing the hydraulic pressure to the first clutch 108A.

The second electromagnetic valve 150B controls the hydraulic pressure to the second clutch 108B based on an instruction from the control device. More specifically, the outer shaft 110$o$ and the crankshaft are connected by applying the hydraulic pressure to the second clutch 108B. On the other hand, the connection is cut off by reducing the hydraulic pressure to the second clutch 108B.

During driving, one of the first and second clutches 108A and 108B is set in a connected state, and the other is set in a disconnected state. Thus, power transmission inside the transmission 40 is performed using any of the speed change gear pairs connected to the inner shaft 110$i$ and the outer shaft 110$o$.

Then, when the shift-up switch 33 or the shift-down switch 34 is operated, the speed change gear pair to be used next is selected from among the speed change gear pairs connected to the inner shaft 110$i$ and the outer shaft 110$o$. Along with this selection, one of the first and second clutches 108A and 108B, which is in the connected state, is switched to the disconnected state, and the other clutch in the disconnected state is switched to the connected state. By this clutch switching operation, the power transmission in the transmission 40 is switched to one using the speed change gear pair selected beforehand, i.e., shift-up or shift-down of the transmission 40 is performed.

To be more specific, the first clutch 108A is connected in the first, third, fifth and seventh speeds, while the second clutch 108B is connected in the second, fourth and sixth speeds. More specifically, the clutch device 108 shifts gears by alternately connecting and disconnecting the both clutches for each speed from the first to seventh speeds.

As shown in FIG. 5, the transmission 40 is of a constantly engaged type in which the drive gears m1 to m7 and the driven gears n1 to n7 corresponding to the respective speeds are constantly engaged with each other.

The gears m1 to m7 and n1 to n7 are classified broadly into: fixed gears that can be rotated integrally with their supporting shafts (the main shaft 110 and the countershaft 112); free gears that can be rotated relative to the supporting shafts and cannot be moved in the axial direction; and slide gears that can be rotated integrally with the supporting shafts and can also be moved in the axial direction.

To be more specific, the drive gears m1 and m2 are the fixed gears, the drive gears m3 and m6 are the slide gears, and the drive gears m4, m5 and m7 are the free gears.

Meanwhile, the driven gear n7 is the fixed gear, the driven gears n1 to n3 and n6 are the free gears, and the driven gears n4, n5 and n7 are the slide gears. Note that the slide gears are spline-fitted to the supporting shafts.

More specifically, as to the gear arrangement on the inner shaft 110$i$, the fixed gear m1, the free gear m5, the slide gear m3 and the free gear m7 are arranged from the position closer to the clutch device to the position farther from the clutch device. On the countershaft 112, the free gear n1, the slide gear n5, the free gear n3 and the fixed gear n7 are arranged corresponding to the above gears.

As to the gear arrangement on the outer shaft 110$o$, the fixed gear m2, the free gear m4 and the slide gear m6 are arranged from the position closer to the clutch device 108 to the position farther from the clutch device. On the countershaft 112, the free gear n2, the slide gear n4 and the free gear n6 are arranged corresponding to the above gears.

More specifically, the free gears on the countershaft 112 are engaged with the fixed gears or the slide gears on the main shaft 110, and the slide gears on the countershaft 112 are engaged with the free gears on the main shaft 110.

When the shift drum 183 is rotationally driven by the shift motor 114, four shift arms A1 to A4 slide in the axial direction to drive the slide gears m3 and m6 as the drive gears and the slide gears n4 and n5 as the driven gears in the axial direction, thereby changing engagement states of dog clutches between the adjacent gears.

On both side surfaces of the drive gear m3, dogs d3a and d3b protruding in the axial direction are provided. When the drive gear m3 slides in one direction (to the right in FIG. 5) along the axial direction from the neutral position, one dog d3a is engaged with a dog hole d7 in the drive gear m7. Likewise, when the drive gear m3 slides in the other direction (to the left in FIG. 5) along the axial direction from the neutral position, the other dog d3b is engaged with a dog hole d5 in the drive gear m5.

On one side surface of the drive gear m4, a dog d4 protruding in the axial direction is provided. Also, on both side surfaces of the drive gear m6, dogs d6a and d6b protruding in the axial direction are provided. When the drive gear m6 slides to the left in the axial direction from the neutral position, the other dog d6b is engaged with the dog of the drive gear m4.

On both side surfaces of the driven gear n5, dogs e5a and e5b protruding in the axial direction are provided. When the driven gear n5 slides to the right in the axial direction from the neutral position, one dog e5a is engaged with a dog hole e3 in the driven gear n3. Likewise, when the driven gear n5 slides to the left in the axial direction from the neutral position, the other dog e5b is engaged with a dog hole e1 in the driven gear n1.

On the other side surface of the driven gear n6, a dog e6 protruding in the axial direction is provided. Also, on both side surfaces of the driven gear n4, dogs d6a and d6b protruding in the axial direction are provided. When the drive gear m6 slides to the left in the axial direction from the neutral position, the other dog d6b is engaged with the dog of the drive gear m4.

Next, description is given of a state where shift-up is performed from the neutral state to the first to seventh speeds in the normal driving mode in which the inner shaft 110i is rotationally driven by the first clutch 108A. In the shift-up operation in the normal driving mode, the countershaft 112 is rotated in a direction opposite to the rotation direction of the main shaft 110, i.e., positively rotated. The rotation force of the positive rotation is transmitted to the drive shaft from an output gear 184, thereby causing the motorcycle 1 to move forward.

When the rotation angle of the shift spindle shows the neutral state, the drive gears m3 and m4 and the driven gears n4 and n5 are at neutral positions, respectively, and thus the rotation force of the main shaft 110 is not transmitted to the countershaft 112. Also, switching between the neutral state and the first-speed in-gear state is executed by a neutral to first speed shift switch 129 provided on the right-side steering handle 5.

Next, when the rotation angle of the shift spindle is changed from the neutral state to the first speed according to the operation of the neutral to first speed shift switch 129, the driven gear n5 is moved to the left in the axial direction. Thus, the rotation force of the inner shaft 110i is transmitted to the countershaft 112 through the drive gear m1 and the driven gears n1 and n5.

This operation is a switching operation from the neutral state to the first speed (in-gear state). In this event, if the engine is on, dragging of a wet clutch due to viscosity of a lubricant oil completely stops the countershaft 112 while the main shaft 110 is rotated. Therefore, the drive wheel is slightly rotated by kinetic energy transmitted during switching, and thus behavior may occur in the vehicle body. To be more specific, shock occurs when the dog e5b of the stopped driven gear n5 is fitted into the dog hole e1 in the driven gear n1 rotated synchronously with the main shaft 110. This shock emerges as behavior of the vehicle body trying to move slightly forward when switching from the neutral state to the first speed. In-gear control for suppressing such behavior is described later.

Then, when the rotation angle of the shift spindle is changed from the first speed to the second speed, the first clutch 108A is disconnected to shift to rotational drive of the outer shaft 110o by the second clutch 108B, and the driven gear n4 is moved to the left in the axial direction. Thus, the rotation force of the outer shaft 110o is transmitted to the countershaft 112 through the drive gear m2 and the driven gears n2 and n4.

When the rotation angle of the shift spindle is changed from the second speed to the third speed, the second clutch 108B is disconnected to shift to rotational drive of the inner shaft 110i by the first clutch 108A, and the driven gear n5 is moved to the right in the axial direction. Thus, the rotation force of the inner shaft 110i is transmitted to the countershaft 112 through the drive gear m3 and the driven gears n3 and n5.

When the rotation angle of the shift spindle is changed from the third speed to the fourth speed, the first clutch 108A is disconnected to shift to rotational drive of the outer shaft 110o by the second clutch 108B, and the driven gear n6 is moved to the left in the axial direction. Thus, the rotation force of the outer shaft 110o is transmitted to the countershaft 112 through the drive gear m6 and the driven gear n4.

When the rotation angle of the shift spindle is changed from the fourth speed to the fifth speed, the second clutch 108B is disconnected to shift to rotational drive of the inner shaft 110i by the first clutch 108A, and the driven gear n3 is moved to the left in the axial direction. Thus, the rotation force of the inner shaft 110i is transmitted to the countershaft 112 through the drive gears m3 and m5 and the driven gear n5.

When the rotation angle of the shift spindle is changed from the fifth speed to the sixth speed, the first clutch 108A is disconnected to shift to rotational drive of the outer shaft 110o by the second clutch 108B. Then, the drive gear m6 is returned to the neutral position, and the driven gear n4 is moved to the right in the axial direction. Thus, the rotation force of the outer shaft 110o is transmitted to the countershaft 112 through the drive gear m6 and the driven gears n6 and n4.

When the rotation angle of the shift spindle is changed from the sixth speed to the seventh speed, the second clutch 108B is disconnected to shift to rotational drive of the inner shaft 110i by the first clutch 108A, and the drive gear m3 is moved to the right in the axial direction. Thus, the rotation force of the inner shaft 110i is transmitted to the countershaft 112 through the drive gears m3 and m7 and the driven gear n7.

The transmission 40 has a backward gear train 180 for backward driving. The backward gear train 180 includes: a drive gear mB provided between the drive gear m1 on the inner shaft 110i and the drive gear m6 on the outer shaft 110o; and a driven gear nB provided between the driven gears n1 and n6 on the countershaft 112. The drive gear mB is a single free gear, and the driven gear nB is a free gear integrated with the driven gear n1 and rotated with the driven gear n1. An endless drive chain 182 is wound around the drive gear mB and the driven gear nB, and the both gears are rotated in the same direction.

Then, when the rotation angle of the shift spindle is changed to an angle corresponding to a preset slow speed mode, the position of the shift drum 183 is set at a preset slow speed mode position. Accordingly, the drive gear m6 slides to the right in the axial direction from the neutral position, and the driven gear n4 slides to the left in the axial direction from the neutral position. Thus, one dog d6a of the drive gear m6 is engaged with a dog hole db of the drive gear mB, and the other dog e4b of the driven gear n4 is engaged with the dog hole e2 of the driven gear n2.

The above operation is a switching operation from the neutral state to the slow speed mode as the in-gear state. In this event, if the engine is on, dragging of the clutch due to viscosity of the lubricant oil completely stops the countershaft 112 while the main shaft 110 is rotated. Therefore, the drive wheel is slightly rotated by kinetic energy transmitted during switching, and thus behavior may occur in the vehicle body.

To be more specific, shock occurs when the dog d6a of the drive gear m6 rotated synchronously with the main shaft 110 is fitted into the dog hole db in the drive gear mB stopped since the drive chain 182 is wound therearound. This shock emerges as behavior of the vehicle body trying to move slightly backward when switching from the neutral state to the slow speed mode. The in-gear control for suppressing such behavior is described later.

After the shift to the slow speed mode, the forward driving switch (in this embodiment, the shift-down switch 34) is operated to perform a forward driving operation in the slow speed mode. To be more specific, according to the operation of the forward driving switch, the second clutch 108B is connected and the first clutch 108A is disconnected. Then, the rotation force of the crankshaft in the idling state is transmitted to the outer shaft 110o through the second clutch 108B.

More specifically, the rotation force of the outer shaft 110o is transmitted to the countershaft 112 through the drive gear m2 and the driven gear n2, causing positive rotation of the countershaft 112. The rotation force of the positive rotation is transmitted to the drive shaft, causing the motorcycle 1 to move forward at slow speed by the engine driving force. In this event, the rotation force of the outer shaft 110o is also transmitted to the inner shaft 110i through the drive gear m6, the drive gear mB, the gear chain 182, the driven gear n1 and the drive gear m1. However, since the odd-numbered gears are in the neutral state, the inner shaft 110i only runs idle.

Meanwhile, after the shift to the slow speed mode, the backward driving switch (in this embodiment, the shift-up switch 33) is operated to perform a backward driving operation in the slow speed mode. To be more specific, according to the operation of the backward driving switch, the first clutch 108A is connected and the second clutch 108B is disconnected. Then, the rotation force of the crankshaft in the idling state is transmitted to the inner shaft 110i through the first clutch 108A.

The rotation force of the inner shaft 110i is transmitted to the outer shaft 110o through the drive gear m1, the driven gear n1, the driven gear nB, the drive chain 182, the drive gear mB and the drive gear m6. In this event, the rotation direction of the outer shaft 110o is opposite to that of the inner shaft 110i, and the rotation force of the outer shaft 110o is transmitted to the countershaft 112 through the drive gear m4, the driven gear n2 and the driven gear n4.

In this case, the countershaft 112 is rotated in the same direction as the inner shaft 110i. The rotation force in a direction opposite to that during the forward driving is transmitted to the drive shaft, causing the motorcycle 1 to move backward at slow speed by the engine driving force.

With reference to FIG. 7, the motorcycle 1 includes a hydraulic brake system capable of controlling braking force by the control device (ECU) 106. A double-disk front wheel side brake device BF has the following configuration. Oil paths of a pair of left and right front brake calipers 63 sandwiching brake disks 62 of the front wheel WF are connected to a front wheel side valve unit 72. Furthermore, a front wheel side input means 60 including a front brake lever attached to the steering handle 5 and a hydraulic master cylinder and a front wheel side hydraulic modulator 73 for generating a hydraulic pressure by a motor are connected to the front wheel side valve unit 72.

On the other hand, a single-disk rear wheel side brake device BR has the following configuration. An oil path of a rear brake caliper 69 clamping a brake disk 70 of the rear wheel WR is connected to a rear wheel side valve unit 76. Furthermore, a rear wheel side input means 61 including a rear brake pedal attached below the foot-rest step 14 and a hydraulic master cylinder and a rear wheel side hydraulic modulator 75 for generating a hydraulic pressure by a motor are connected to the rear wheel side valve unit 76.

The ECU 106 controls the front and rear valve units 72 and 76 and the front and rear hydraulic modulators 73 and 75 based on information from hydraulic sensors P1 to P4 provided in the oil paths, a front wheel rotation speed sensor 64, a rear wheel rotation speed sensor 71 and the brake switch 140.

The front wheel side valve unit 72 has a function to switch a supply source of a hydraulic pressure to be transmitted to the front brake caliper 63 between the front wheel side input means 60 and the hydraulic modulator 73. To be more specific, during normal driving, the front wheel side input means 60 is used as a sensor for determining a brake pressure, and the hydraulic modulator 73 activates the front brake caliper 63 with the generated hydraulic pressure. Then, only when the engine is stopped or trouble occurs in the hydraulic modulator 73, the front wheel side input means 60 and the front brake calipers 63 are directly connected to each other.

This configuration enables anti-lock brake control when the wheels are locked, automatic brake control for maintaining a stably stopped state of the vehicle body regardless of operations by the rider, and the like. In this embodiment, the rear wheel brake side also has the same configuration, and the braking force of the front and rear wheels can be independently or simultaneously controlled by the ECU 106.

The braking force control apparatus according to the present invention is configured to execute
(1) brake control during the slow speed mode
(2) brake control when switching from the neutral state to the in-gear state using the brake system described above.

Figure 8:
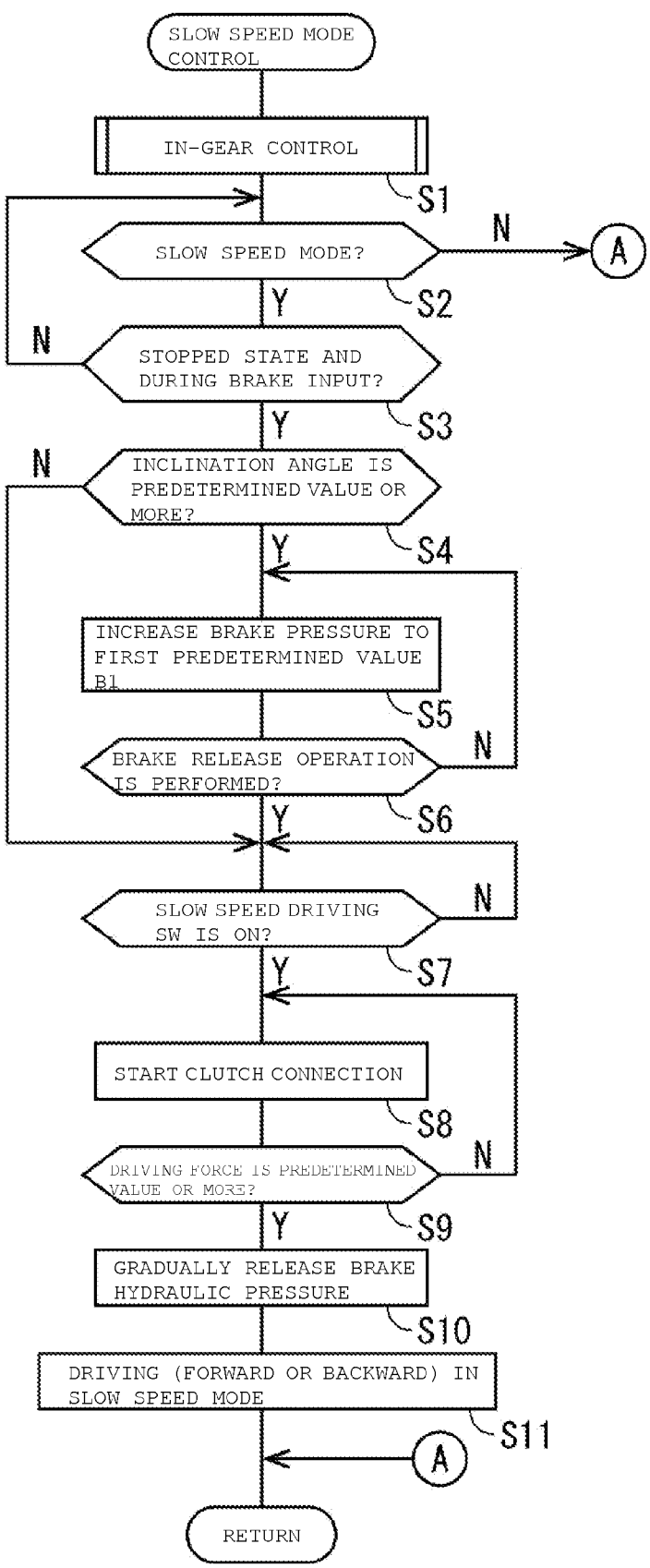
FIG. 8 is a flowchart showing the process of slow speed mode control according to an exemplary embodiment of the present invention.

FIG. 8 is a flowchart showing the process of slow speed mode control according to an exemplary embodiment of the present invention. As described above, the slow speed mode is a mode to be arbitrarily selected by the rider when he/she wishes to move the vehicle body forward or backward at slow speed, such as driving into or out of a parking lot. In this event, if the road surface is inclined, the rider needs to operate the slow speed driving switch while supporting the vehicle body and performing a brake operation so as to prevent the vehicle from moving due to the inclination.

Therefore, in this embodiment, when the inclination of the road surface is detected during the slow speed mode, braking force for stopping the vehicle body is automatically generated, and the braking force is released according to an operation of the slow speed driving switch.

First, in Step S1, in-gear control to be described later is executed. After the in-gear control, the processing advances to Step S2 to determine whether or not the slow speed mode is set.

When the result of the determination in Step S2 is positive, the processing advances to Step S3 to determine whether or not the vehicle is in a stopped state and during brake input. This determination can be executed using a vehicle speed sensor (the wheel rotation speed sensors 64 and 71), the hydraulic sensor P1 and the brake switch 140. For example, the vehicle speed is 3 km/h or less, the hydraulic pressure generated by the front wheel side input means 60 is a predetermined value or more, and the brake switch 140 is ON.

When the result of the determination in Step S3 is positive, the processing advances to Step S4 to determine whether or not the inclination angle of the road surface is a predetermined value or more (e.g., 5 degrees or more). The inclination angle of the road surface can be measured by an inclination angle sensor 139 capable of measuring an inclination angle θ in a pitching direction of the vehicle body.

When the result of the determination in Step S3 is positive, the processing advances to Step S4. On the other hand, when the result of the determination in Step S3 is negative, the processing returns to the determination in Step S2. Then, when the result of the determination in Step S2 is negative, the processing advances to A, and the control is terminated.

When the result of the determination in Step S4 is positive, the processing advances to Step S5 to increase a brake pressure to be applied to the brake caliper to a first predetermined value B1. Thus, when switching to the slow speed mode on a slope where it is difficult to keep the stopped state of the vehicle body without activating the brake, the brake pressure is automatically increased to stop the vehicle body, making it possible to prepare for slow speed driving using the forward driving switch or backward driving switch.

Note that, in this flowchart, it is assumed that the brake pressure to be applied to the rear brake caliper 69 is increased to the first predetermined value B1 by the rear wheel side hydraulic modulator 75, in order to apply the braking force to the rear wheel WR subjected to weight bearing on an uphill. However, when the front wheel WF is subjected to weight bearing on a downhill, for example, the brake pressure to be applied to the front brake caliper 63 may be increased to the first predetermined value B1 by the front wheel side hydraulic modulator 73. Furthermore, when the inclination angle θ is large, braking force of the same magnitude or different magnitudes can be applied to the front and rear wheels WF and WR.

The first predetermined value B1 of the brake pressure can be set to a value determined beforehand according to the inclination angle θ so that the value is sufficient for securely stopping the vehicle body.

Next, in Step S6, it is determined whether or not a brake release operation is performed. This determination is performed to prevent load on the clutch when clutch connection is started while the brake is on, assuming that the rider R is performing a brake operation when stopping on a slope and switching to the slow speed mode by pressing the slow speed mode selector switch 31.

Moreover, by determining whether or not the brake lever of the front wheel side input means 60 is released, it is confirmed that the rider R recognizes that the vehicle body is stopped by the automatically controlled braking force.

Note that the action of the automatically controlled braking force can be notified to the rider R by an indicator or the like of the instrument panel 145.

When the result of the determination in Step S6 is positive, the processing advances to Step S7 to determine whether or not the slow speed driving switch (the slow speed forward driving switch or the slow speed backward driving switch) is turned on. When the result of the determination in Step S7 is positive, clutch connection is started in Step S8.

Subsequently, in Step S9, it is determined whether or not the engine driving force has reached a predetermined value or more. Then, when the result of the determination in Step S9 is positive, the processing advances to Step S10. The engine driving force is estimated and detected based on a clutch hydraulic pressure supplied for the clutch connection. Note that, when the result of the determination in Step S9 is negative, the processing returns to Step S8 to continue the clutch connection. As to the brake hydraulic pressure release control in Step S10, a graph shown in FIG. 11 is referred to.

Figure 11:
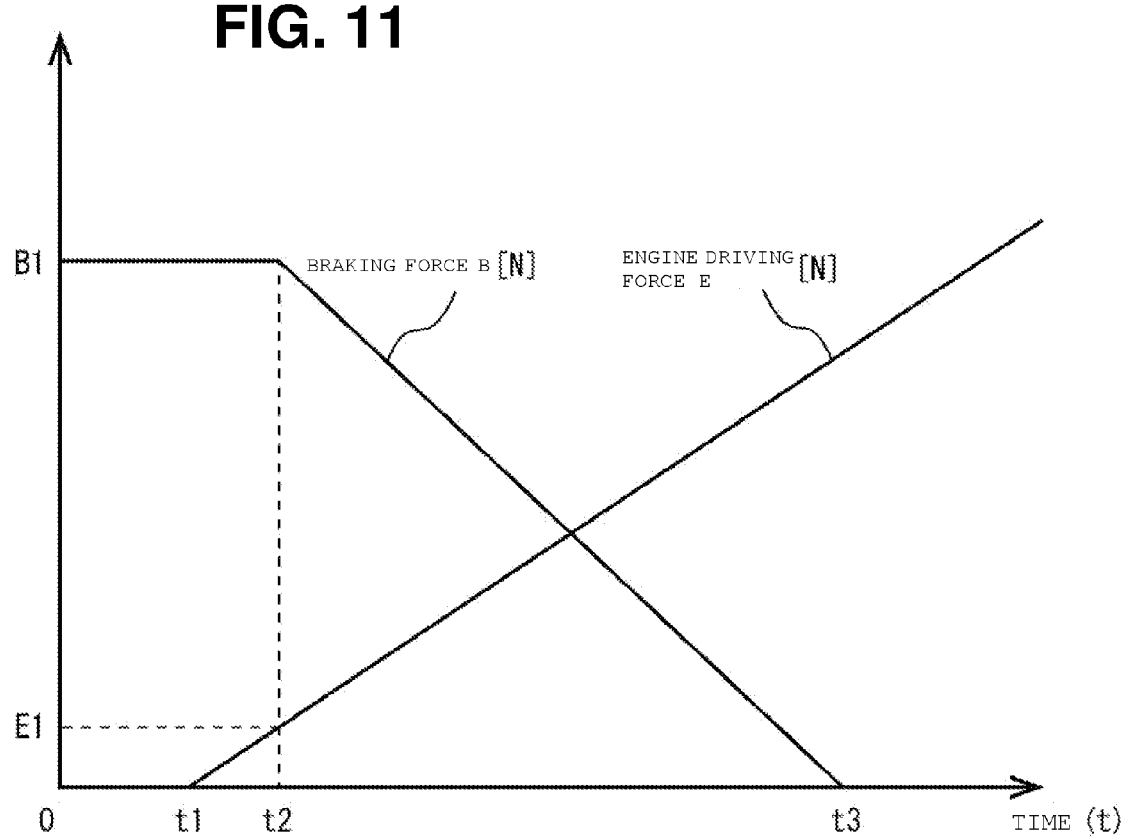
FIG. 11 is a graph showing a relationship between braking force and engine driving force according to an exemplary embodiment of the present invention.

FIG. 11 is a graph showing a relationship between braking force B and engine driving force E when driving is started using a driving switch from a state where the brake is automatically turned on in the slow speed mode. Particularly, the graph corresponds to the case where slow speed forward driving is performed by operating the slow speed forward driving switch (shift-down switch) 34 from the stopped state on an uphill and the case where slow speed backward driving is performed by operating the slow speed backward driving switch (shift-up switch) 33 from the stopped state on a downhill. The braking force B is estimated and detected based on the brake hydraulic pressure.

The following description is given assuming the case where the slow speed forward driving is performed by operating the slow speed forward driving switch 34 from the stopped state on the uphill. In the example shown in the graph, connection of the first clutch 108A is started according to an operation of the slow speed forward driving switch 34, and the engine driving force E starts to be increased from time t1. At time t1, the braking force B is still maintained at the first predetermined value B1 set according to the inclination angle θ.

Next, at time t2, the engine driving force E is increased to E1, and the braking force B starts to be reduced accordingly. The engine driving force E1 can be set to a value set beforehand by an experiment or the like so as to prevent the vehicle from moving and to reduce the load on the clutch.

In this exemplary embodiment, the engine driving force E continues to be increased until the braking force B reaches zero at time t3, and forward driving is started when the gravity exceeds the force of moving the vehicle body backward. Note that the engine driving force E during the slow speed forward driving on the uphill can be changed according to the inclination angle θ so as to achieve the same vehicle speed as that during slow speed forward driving on a level ground. Moreover, a change in brake hydraulic pressure when reducing the braking force B and a change in clutch hydraulic pressure when increasing the engine driving force E are not limited to a linear pattern but may be a curved pattern.

Referring back to the flowchart shown in FIG. 8, when the engine driving force E is increased to a certain level along with the gradual release of the brake hydraulic pressure in Step S10, driving in the slow speed mode (slow speed forward driving on the uphill or slow speed backward driving on the downhill) is executed in Step S11. Then, a series of controls are terminated.

Note that, when the operation of pressing the slow speed driving switch is stopped during the driving in the slow speed mode, the braking force can be set to act according to the inclination angle θ detected at the same time.

Moreover, the braking force may be set to be released without waiting for the engine driving force to rise in the case of slow speed backward driving by operating the slow speed backward driving switch 33 from the stopped state on the uphill and the case of slow speed forward driving by operating the slow speed forward driving switch 34 from the stopped state on the downhill.

Figure 9:
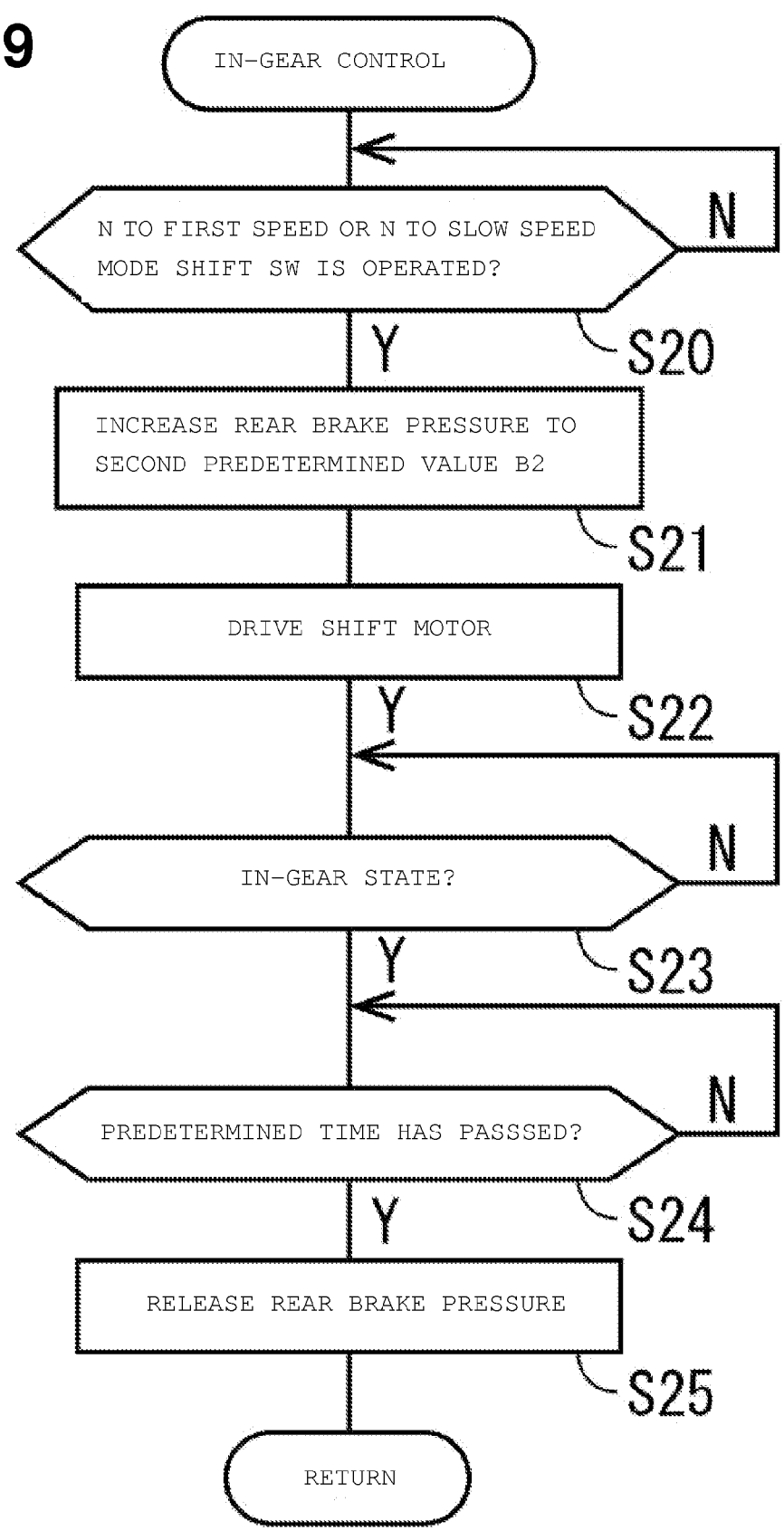
FIG. 9 is a flowchart showing the process of in-gear control according to an exemplary embodiment of the present invention.

FIG. 9 is a flowchart showing the process of "in-gear control" that is a subroutine shown in Step S1 of FIG. 8.

As described above, in the transmission 40 according to this embodiment, the force of moving the vehicle body forward is generated during the in-gear operation for shifting from the neutral state to the first speed when the engine is on, and, likewise, the force of moving the vehicle body backward is generated during the in-gear operation for shifting from the neutral state to the slow speed mode.

The in-gear control is control for activating the rear wheel side brake before driving the shift motor 113 when the neutral to first speed shift switch 129 or the slow speed mode selector switch is operated so as to switch to the in-gear state to suppress behavior caused by such force. When this control causes the braking force to act on the rear wheel WR, the swing arm 27 is swung by the driving force of the rear wheel WR during switching to the in-gear state, thus making it possible to prevent behavior that the seating position is moved upward or downward. Particularly, the swinging of the swing arm 27 in the in-gear state occurs because the swing arm 27 is supported on the vehicle body through the rear cushion 26. Note that the behavior prominently appears also in a state where the brake on the wheel (front wheel WF) that is not supported by the swing arm 27 is activated. However, since similar behavior may also occur when the brake is not activated, determination on the brake is omitted in this embodiment.

In Step S20, it is determined whether or not the neutral to first speed shift switch 129 for switching from N (neutral state) to the first speed or the slow speed mode selector switch 31 for switching from N (neutral state) to the slow speed mode is operated.

When the result of the determination in Step S20 is positive, control for increasing a rear brake pressure to be applied to the rear brake caliper 69 to a second predetermined value B2 is executed in Step S21. This second predetermined value B2 can be determined beforehand by an experiment or the like, as a minimum brake pressure, at which no unnecessary behavior occurs in the vehicle body.

Then, the shift motor 114 is driven in Step S22 to start switching to the in-gear state. Even when shock is caused by fitting of the dog clutches along with the switching operation, the rear wheel WR is not rotated because of the action of the rear braking force. Thus, the behavior that the seating position is moved upward or downward does not occur. Subsequently, in Step S23, it is determined, based on the output from the drum position sensor 138, whether or not a shift is made to the in-gear state. Note that, as to the determination on the in-gear state, the following methods are conceivable: detecting the rotation angle of the shift drum 183 in the transmission 40 and determining the in-gear state from the detected angle; monitoring the rotation frequency of the main shaft in the transmission 40 and determining the in-gear state when the rotation frequency reaches a predetermined value or less; and the like, for example.

When the results of the determinations in Steps S20 and S23 are negative, the processing returns to the respective determinations.

When the result of the determination in Step S23 is positive, the processing advances to Step S24. In Step S24, it is determined, based on a measured value of a timer, whether or not a predetermined time has passed since the shift to the in-gear state. Then, when the result of the determination in Step S24 is negative, the processing returns to Step S24. On the other hand, when the result of the determination in Step S24 is positive, the processing advances to Step S25 to release the rear brake pressure since the action of the rear brake pressure is no longer required. Then, a series of controls are terminated.

Note that, when the inclination angle θ of the road surface is detected after the result of the determination in Step S23 is positive and the inclination angle θ is the predetermined value or more, i.e., the uphill, the brake pressure may be set to be maintained, rather than being immediately released, for a certain period of time or until the engine driving force E exceeds a predetermined value.

Figure 12:
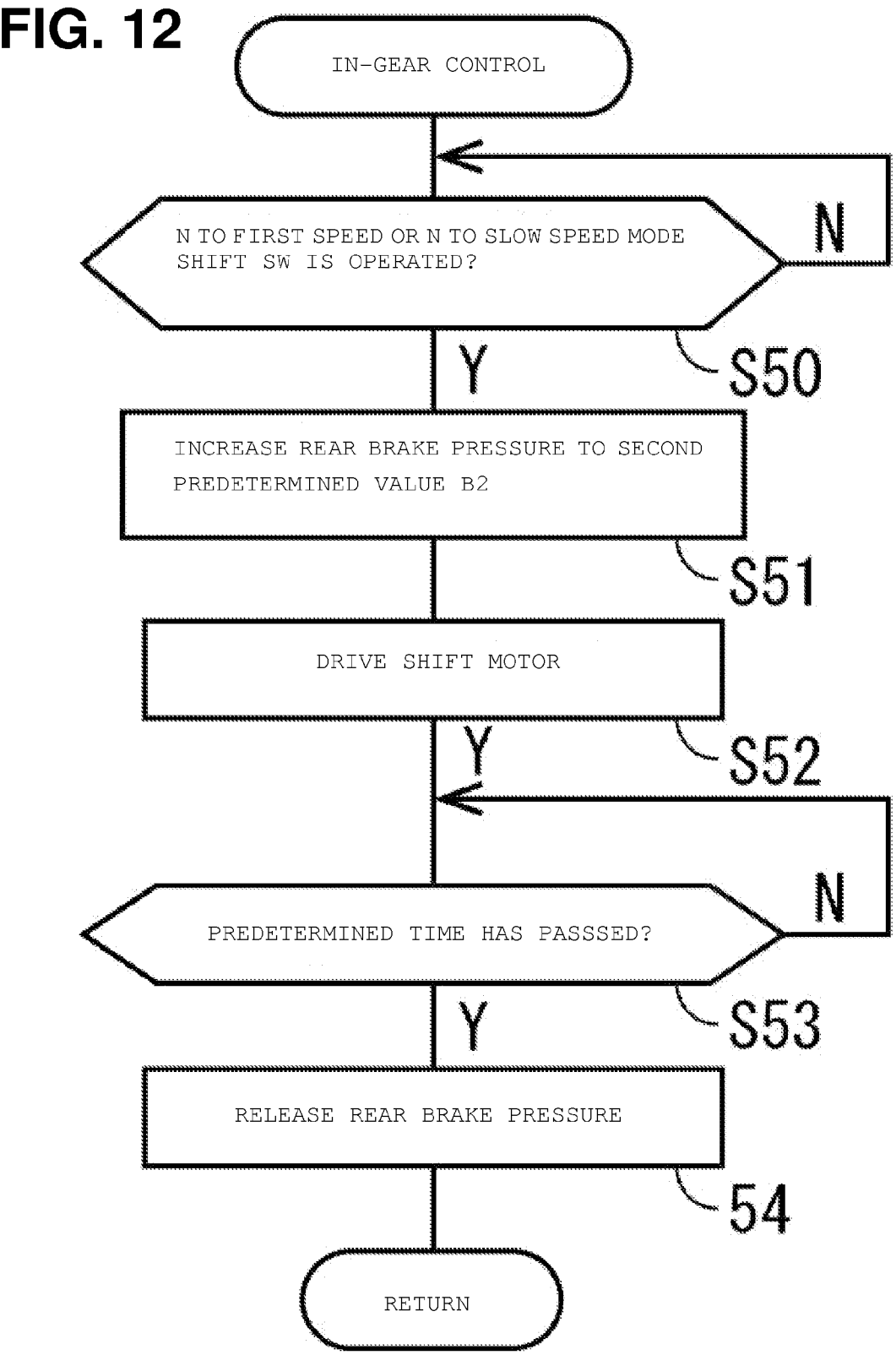
FIG. 12 is a flowchart showing the process of a modified example of the in-gear control according to an exemplary embodiment of the present invention.

Moreover, the in-gear control described above may be modified as shown in FIG. 12. More specifically, after determining in Step S50 that the neutral to first speed shift switch 129 or the slow speed mode selector switch 31 is operated, the rear brake pressure is increased to the second predetermined value B2 in Step S51. Then, in Step S52, the shift motor 114 is driven, and time measurement is started using the timer at the same time as the start of switching to the in-gear state. Then, it is determined in Step S53 that the predetermined time has passed, without particularly determining the in-gear state. Thus, release of the rear brake pressure is executed in Step S54. Then, a series of controls are terminated.

Figure 13:
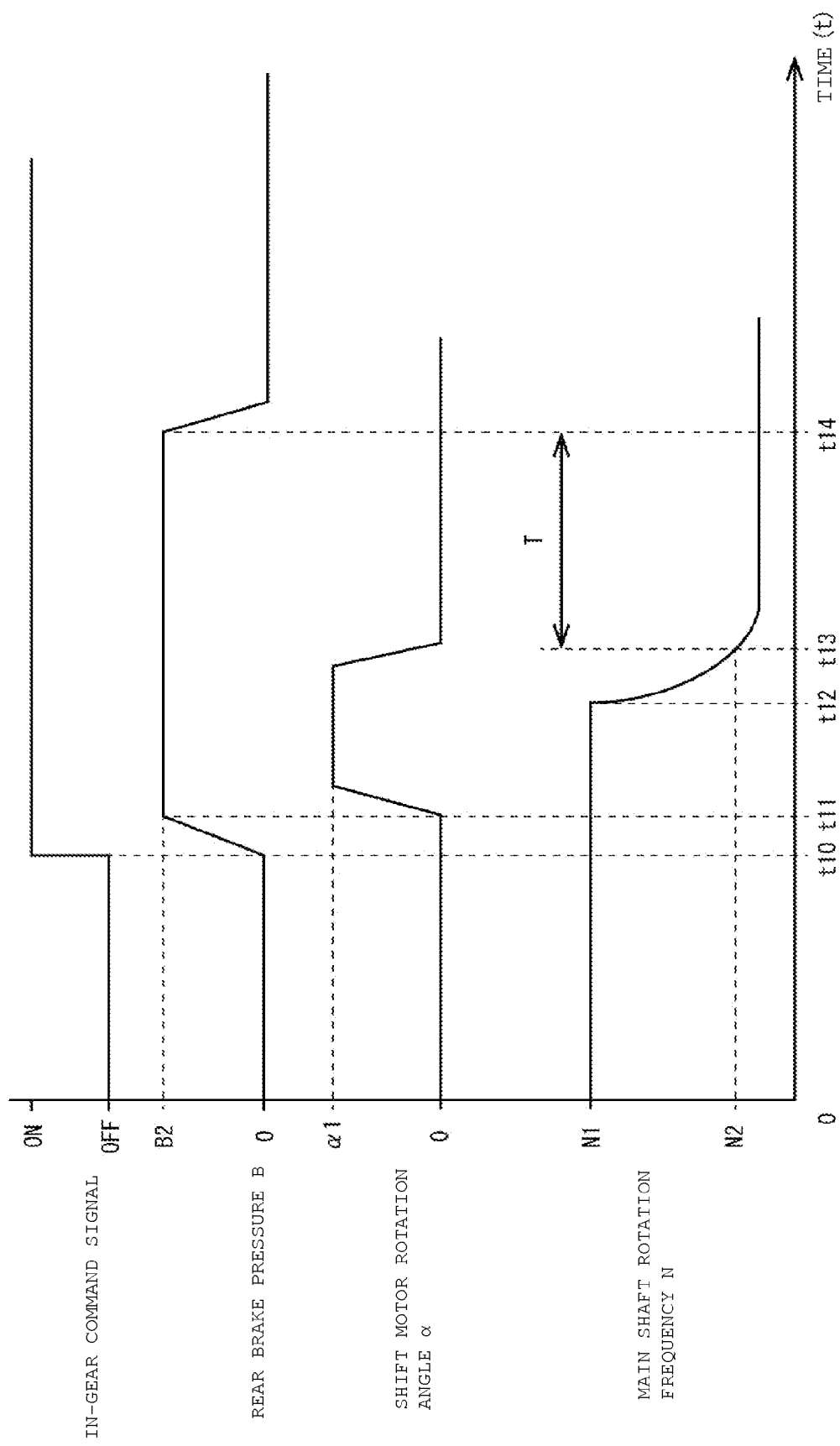
FIG. 13 is a time chart showing the flow of the in-gear control according to an exemplary embodiment of the present invention.

Here, with reference to a time chart shown in FIG. 13, the flow of the in-gear control is further described. At time t=0, an in-gear command signal is in an off state, and the main shaft 110 of the transmission 40 is rotated at a rotation frequency N1. When the in-gear command signal is switched to an on state at time t10, the rear brake pressure B starts to be increased in response thereto. At time t11, the rear brake pressure B reaches the second predetermined value B2, and the shift motor 114 starts to operate. The shift motor 114 for intermittently feeding the shift drum 183 is rotated to an angle α1, and is returned to its initial position after the angle α1 is maintained for a predetermined time. The control device 106 can determine that the transmission 40 is switched to the in-gear state, based on the fact that the shift motor 114 is maintained at the angle α1.

Moreover, at time t12 when the shift motor 114 is maintained at the angle α1, the rotation frequency N of the main shaft 110 starts to be reduced from N1 and then to a predetermined value N2 at time t13. The control device 106 can also determine that the transmission 40 is switched to the in-gear state, based on the change in rotation frequency of the main shaft 110. In the time chart, time measurement using the timer is started from time t13, and release of the rear brake pressure is started at time t14 when a predetermined time T has passed.

As conditions for switching from the neutral state to the slow speed mode, the shift motor is being stopped, the shift drum is at the neutral position, the throttle grip is completely closed, the stopped state (the vehicle speed is a predetermined value or less), the engine is in the idling state, the brake switch is in the on state, the side kickstand is in the up state, and the slow speed mode selector switch 31 is operated.

Meanwhile, as conditions for switching to the normal driving mode, the shift motor is being stopped, the shift drum is at the slow speed mode position, the throttle grip is completely closed, the stopped state (the vehicle speed is a predetermined value or less), the brake switch is in the on state, and the slow speed mode selector switch 31 is operated.

Note that the control device 106 can combine clutch control besides engine output control, as control for keeping the speed constant during the slow speed forward driving or the slow speed backward driving. This is realized by reducing the speed of the crankshaft, using a clutch interlock phenomenon, by performing half-clutch connection of the second clutch 108B when the vehicle speed exceeds a predetermined value during slow speed forward driving by connecting the first clutch 108A.

Figure 10:
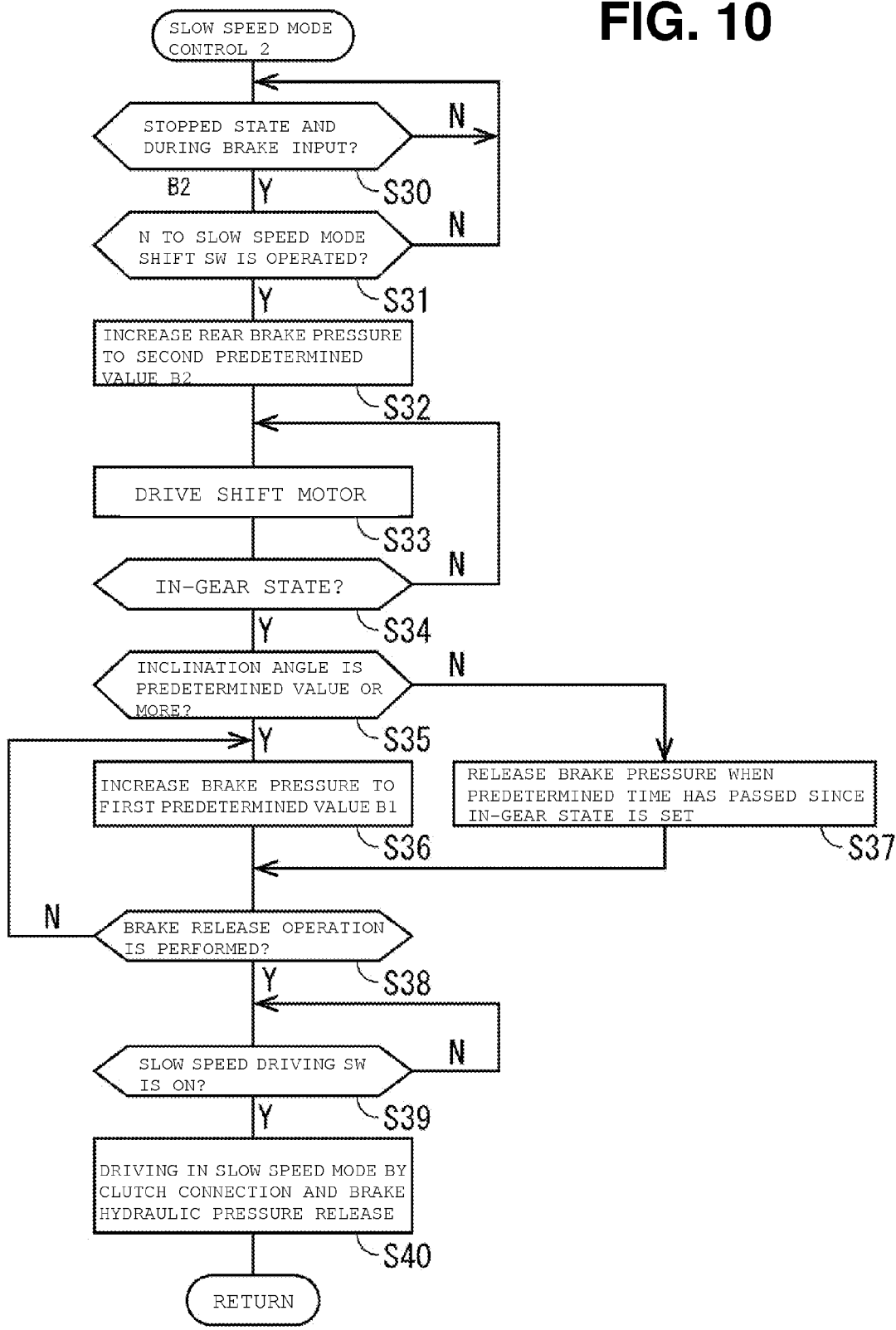
FIG. 10 is a flowchart showing the process of slow speed mode control 2 according to an exemplary embodiment of the present invention.

FIG. 10 is a flowchart showing the process of slow speed mode control 2 that is a modified example of the slow speed mode control according to the present invention. The slow speed mode control 2 has the following characteristics. Specifically, the stopped state and the presence of brake input are added to the conditions for switching from the neutral state to the slow speed mode. Moreover, when the inclination angle θ is a predetermined value or more upon completion of switching to the in-gear state, the rear brake pressure is maintained. On the other hand, when the inclination angle θ is not the predetermined value or more, the brake pressure is released after a predetermined time (e.g., 0.5 seconds later) when inertia torque is predicted to be stopped. For this predetermined time, measurement using a timer is started after a shift to the in-gear state is determined.

In Step S30, it is determined whether or not the vehicle is in a stopped state and during brake input. When the result of the determination in Step S30 is positive, the processing advances to Step S31 to determine whether or not a switching operation from the neutral state to the slow speed mode is performed, i.e., the slow speed mode selector switch 31 is operated.

When the result of the determination in Step S31 is positive, control for increasing a rear brake pressure to be applied to the rear brake caliper 69 to a second predetermined value B2 is executed in Step S32.

Then, the shift motor 114 is driven in Step S33 to start switching to the in-gear state. Even when shock is caused by fitting of the dog clutches along with the switching operation, the rear wheel WR is not rotated because of the action of the rear braking force. Thus, the behavior that the seating position is moved upward or downward does not occur. Subsequently, in Step S34, it is determined, based on the output from the drum position sensor 138, whether or not a shift is made to the in-gear state. When the results of the determinations in Steps S31 and S34 are negative, the processing returns to the respective determinations.

When the result of the determination in Step S34 is positive, the processing advances to Step S35 to determine whether or not the inclination angle θ of the road surface is a predetermined value or more (e.g., 5 degrees or more). Then, when the result of the determination in Step S35 is positive, the processing advances to Step S36 to increase the brake pressure to the first predetermined value B1. On the other hand, when the result of the determination in Step S35 is negative, the processing advances to Step S37 to release the brake pressure after a predetermined time (e.g., 0.5 seconds) has passed since the determination in Step S34 that the shift is made to the in-gear state.

The reason why the brake pressure release control is not performed until the predetermined time passes is to wait for the influence of the inertia torque to be eliminated, which is caused by the driven-side clutch plate and the main shaft 110 taken around by dragging of the clutch.

In Step S38, it is determined whether or not a brake release operation is performed, i.e., the rider R has released the brake lever. When the result of the determination in Step S38 is positive, the processing advances to Step S39 to determine whether or not the slow speed driving switch (the slow speed forward driving switch or the slow speed backward driving switch) is turned on. Note that the processing returns to Step S36 when the result of the determination in Step S38 is negative, and returns to Step S39 when the result of the determination in Step S39 is negative.

Then, when the result of the determination in Step S39 is positive, smooth start control is executed in Step S40 by starting the clutch connection and releasing the brake hydraulic pressure in a collaborative manner, and driving in the slow speed mode is performed. Then, a series of controls are terminated.

Note that the shapes and structures of the engine, the transmission and twin clutch, the shape and structure of the slow speed mode selector switch, the structure of the clutch hydraulic path, the structure of the brake device, the setting of the first and second predetermined values of the braking force, and the like are not limited to those in the exemplary embodiment described above, but various changes can be made thereto. While exemplary embodiments of the present invention have been described above, the invention is not to be restricted to the above embodiments, and various modifications are possible within the scope of the gist of the invention.

For example, for the action of the braking force when a slope is detected in the slow speed mode, only the front wheel, only the rear wheel or both of the front and rear wheels is selected according to the inclination direction, such as an uphill or a downhill, besides the inclination angle. Thus, different braking forces can be realized. To be more specific, braking force can be set to be generated on the front wheel that bears weight in the case of a downhill, and also to be generated on the rear wheel that bears weight in the case of an uphill. Various settings for the braking force, the vehicle speed, the inclination angle and the like described above can be arbitrarily changed according to the characteristics of the vehicle, and the like. The braking force control apparatus for a saddle ride vehicle according to the present invention is not limited to a motorcycle but is also applicable to various vehicles such as a saddle riding type three or four-wheel vehicle.

EXPLANATION OF THE REFERENCE NUMERALS

1 MOTORCYCLE
40 TRANSMISSION
31 SLOW SPEED MODE SELECTOR SWITCH
33 SHIFT-UP SWITCH (SLOW SPEED BACKWARD DRIVING SWITCH, SHIFT OPERATION MEANS)
34 SHIFT-DOWN SWITCH (SLOW SPEED FORWARD DRIVING SWITCH, SHIFT OPERATION MEANS)
62 FRONT BRAKE DISK
63 FRONT BRAKE CALIPER
69 REAR BRAKE CALIPER
70 REAR BRAKE DISK
100 ENGINE
106 CONTROL DEVICE (CONTROL UNIT, ECU)
108 TWIN CLUTCH (CLUTCH DEVICE)
108A FIRST CLUTCH

108B SECOND CLUTCH
110 MAIN SHAFT (MAIN SHAFT)
110i INNER SHAFT
110o OUTER SHAFT
112 COUNTERSHAFT
114 SHIFT MOTOR
139 INCLINATION ANGLE SENSOR
144 TBW MOTOR
156 SLOW SPEED MODE SHIFT DETERMINATION UNIT
158 NORMAL DRIVING MODE SHIFT DETERMINATION UNIT
162 FORWARD AND BACKWARD CLUTCH HYDRAULIC CONTROL UNIT
164 DRUM OPERATION CONTROL UNIT
WF FRONT WHEEL (THE OTHER WHEEL)
WR REAR WHEEL (DRIVE WHEEL)
BF, BR BRAKE DEVICE
B BRAKING FORCE
B1 FIRST PREDETERMINED VALUE
B2 SECOND PREDETERMINED VALUE
E ENGINE DRIVING FORCE

We claim:

1. A braking force control apparatus for a saddle ride vehicle, comprising:
a control device configured to control a transmission which reduces driving force of an engine by a predetermined speed reduction ratio and transmits the driving force to a drive wheel of the vehicle,
a clutch device which connects and disconnects the driving force between the engine and the transmission,
a brake device which generates braking force on the drive wheel, and
a sensor which detects a state of the transmission,
wherein the transmission is configured to switch between a neutral state where gear trains thereof are mechanically disconnected and an in-gear state where the gear trains are mechanically connected, and
when the sensor detects that the transmission is switching from the neutral state to the in-gear state during operation, the control device causes the brake device to generate braking force on the drive wheel, and then releases the braking force upon completion of the switching to the in-gear state so that shock producing behavior of the vehicle associated with rotation of the drive wheel is suppressed when the transmission is switched from the neutral state to the in-gear state.

2. The braking force control apparatus for a saddle ride vehicle, according to claim 1, wherein the transmission includes a shaft, dog clutches which slide on the shaft, and gears which are also disposed on the shaft and engaged by the dog clutches to which the gears are adjacent, and wherein the switching between the neutral state and the in-gear state by the transmission is performed by connecting and disconnecting the dog clutches.

3. The braking force control apparatus for a saddle ride vehicle, according to claim 2, wherein the drive wheel is pivotally supported by a swing arm that is swingably supported on a vehicle body of the vehicle through a rear cushion.

4. The braking force control apparatus for a saddle ride vehicle, according to claim 3, wherein the gear trains of the transmission include a backward gear train which enables backward driving of the vehicle by the driving force of the engine, and the in-gear state includes an operation state using the backward gear train as a driving force transmission path.

5. The braking force control apparatus for a saddle ride vehicle, according to claim 2, wherein the gear trains of the transmission include a backward gear train which enables backward driving of the vehicle by the driving force of the engine, and the in-gear state includes an operation state using the backward gear train as a driving force transmission path.

6. The braking force control apparatus for a saddle ride vehicle, according to claim 2, wherein the shaft is a main shaft, the transmission further includes a countershaft which is disposed in parallel to the main shaft and operatively connected to the main shaft so as to be rotated together therewith, dog clutches which slide on the countershaft, and gears which are disposed on the countershaft and engaged by the dog clutches to which the gears are adjacent.

7. The braking force control apparatus for a saddle ride vehicle, according to claim 6, wherein the transmission is configured to be operated a normal driving mode and a slow speed driving mode, the countershaft rotates in one direction during the normal driving mode, and the countershaft rotates in an opposite direction during backward the slow speed driving mode.

8. The braking force control apparatus for a saddle ride vehicle, according to claim 1, wherein the drive wheel is pivotally supported by a swing arm that is swingably supported on a vehicle body of the vehicle through a rear cushion.

9. The braking force control apparatus for a saddle ride vehicle, according to claim 8, wherein the gear trains of the transmission include a backward gear train which enables backward driving of the vehicle by the driving force of the engine, and the in-gear state includes an operation state using the backward gear train as a driving force transmission path.

10. The braking force control apparatus for a saddle ride vehicle, according to claim 1, wherein the gear trains of the transmission include a backward gear train which enables backward driving of the vehicle by the driving force of the engine, and the in-gear state includes an operation state using the backward gear train as a driving force transmission path.

11. A method for controlling braking force for a saddle ride vehicle having a transmission which reduces driving force of an engine by a predetermined speed reduction ratio and transmits the driving force to a drive wheel of the vehicle, a clutch device which connects and disconnects the driving force between the engine and the transmission, a brake device which generates braking force on the drive wheel, and a sensor which detects a state of the transmission, comprising the steps of:
configuring the transmission to switch between a neutral state where gear trains thereof are mechanically disconnected and an in-gear state where the gear trains are mechanically connected, and
controlling the brake device during operation of the vehicle so that when the sensor detects that the transmission is switching from the neutral state to the in-gear state, the brake device generates braking force on the drive wheel, and then releases the braking force upon completion of the switching to the in-gear state so that shock producing behavior of the vehicle associated with rotation of the drive wheel is suppressed when the transmission is switched from the neutral state to the in-gear state.

12. The method for controlling braking force, according to claim 11, wherein the transmission includes a shaft, dog clutches which slide on the shaft, and gears which are also disposed on the shaft and engaged by the dog clutches to which the gears are adjacent, and wherein the switching between the neutral state and the in-gear state by the transmission is performed by connecting and disconnecting the dog clutches.

13. The method for controlling braking force, according to claim 12, wherein the gear trains of the transmission include a backward gear train which enables backward driving of the vehicle by the driving force of the engine, and the in-gear state includes an operation state using the backward gear train as a driving force transmission path.

14. The method for controlling braking force, according to claim 11, wherein the drive wheel is pivotally supported by a swing arm that is swingably supported on a vehicle body of the vehicle through a rear cushion.

15. The method for controlling braking force, according to claim 11, wherein the gear trains of the transmission include a backward gear train which enables backward driving of the vehicle by the driving force of the engine, and the in-gear state includes an operation state using the backward gear train as a driving force transmission path.

\* \* \* \* \*